(12) United States Patent
Vignau

(10) Patent No.: US 12,332,433 B2
(45) Date of Patent: *Jun. 17, 2025

(54) SOFT FOLLOW AND PITCH ANGLE EFFECTS FOR VR/AR INTERFACE

(71) Applicant: Snap Inc., Santa Monica, CA (US)

(72) Inventor: Mathieu Emmanuel Vignau, Los Angeles, CA (US)

(73) Assignee: Snap Inc., Santa Monica, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/427,090

(22) Filed: Jan. 30, 2024

(65) Prior Publication Data
US 2024/0168285 A1 May 23, 2024

Related U.S. Application Data

(63) Continuation of application No. 17/343,658, filed on Jun. 9, 2021, now Pat. No. 11,899,204.

(51) Int. Cl.
G02B 27/00 (2006.01)
G02B 27/01 (2006.01)
G06F 3/01 (2006.01)
G06F 3/0346 (2013.01)
(Continued)

(52) U.S. Cl.
CPC ....... *G02B 27/0093* (2013.01); *G02B 27/017* (2013.01); *G02B 27/0172* (2013.01); *G02B 27/0179* (2013.01); *G06F 3/011* (2013.01); *G06F 3/012* (2013.01); *G06F 3/013* (2013.01); *G06F 3/0346* (2013.01); *G06T 15/20* (2013.01); *G06T 19/006* (2013.01); G02B 2027/014 (2013.01); G02B 2027/0178 (2013.01);
(Continued)

(58) Field of Classification Search
None
See application file for complete search history.

(56) References Cited

U.S. PATENT DOCUMENTS 10,929,982 B2 2/2021 Hefny et al.
11,899,204 B2 2/2024 Vignau
2010/0045703 A1 2/2010 Kornmann et al.
(Continued)

OTHER PUBLICATIONS

International Search Report and Written Opinion for International Application No. PCT/US2022/032370, dated Dec. 16, 2022 (Dec. 16, 2022)—21 pages.

(Continued)

*Primary Examiner* — Jwalant Amin
(74) *Attorney, Agent, or Firm* — CM Law; Stephen J. Weed

(57) ABSTRACT

The user interface of an electronic eyewear device tracks a user's head movement to keep the user interface in front of the user's eyes. A position forward vector, a rotation forward vector, and an up vector are defined to enable the system to individually adjust the rates of translation and rotation of the user interface as the user's head moves through space. By disconnecting the translation and rotation of the user interface from the head forward vector, the rates of translation and rotational movement of the user interface are separated from the rate of movement of the user's head to enable a delay in user interface movement relative to head movement for a more realistic VR/AR 3D presentation. The pitch angle is monitored to maintain the user interface in front of the user's eyes in the correct orientation even at difficult pitch angles such as straight up or straight down.

17 Claims, 22 Drawing Sheets

(51) Int. Cl.
  *G06T 15/20*  (2011.01)
  *G06T 19/00*  (2011.01)
(52) U.S. Cl.
  CPC ............... *G02B 2027/0181* (2013.01); *G02B 2027/0187* (2013.01)

(56) References Cited

U.S. PATENT DOCUMENTS

| | | |
|---|---|---|
| 2011/0243388 A1 | 10/2011 | Sakaguchi et al. |
| 2014/0300645 A1 | 10/2014 | Gillard et al. |
| 2015/0029188 A1 | 1/2015 | Ege et al. |
| 2016/0357017 A1 | 12/2016 | Nishidate et al. |
| 2019/0018498 A1 | 1/2019 | West et al. |
| 2019/0056901 A1 | 2/2019 | He et al. |
| 2019/0130622 A1 | 5/2019 | Hoover et al. |
| 2020/0103962 A1 | 4/2020 | Burns |
| 2020/0128123 A1 | 4/2020 | Hefner et al. |
| 2020/0327815 A1 | 10/2020 | Frenot |
| 2021/0090311 A1 | 3/2021 | Hoover et al. |
| 2022/0093056 A1 | 3/2022 | Macias et al. |

OTHER PUBLICATIONS

Partial International Search Report and Provisional Opinion Accompanying the Partial Search Result for International Application No. PCT/US2022/032370, dated Oct. 25, 2022 (Oct. 25, 2022)—13 pages.

Tien-Ying Kuo et al: "Fast global motion-compensated frame interpolator for very low-bit-rate video quality enhancement," Proceedings of International Conference on Acoustics, Speech and Signal Processing, Apr. 6-10, 2003 Hong Kong, China; IEEE International Conference on Acoustics, Speech, and Signal Processing (ICASSP)], IEEE, 2003 IEEE International Conf, vol. 3, Apr. 6, 2003 (Apr. 6, 2003), pp. III_113-III_116.

SOFT FOLLOW AND PITCH ANGLE EFFECTS FOR VR/AR INTERFACE

CROSS-REFERENCE TO RELATED APPLICATIONS

This application is a Continuation of U.S. application Ser. No. 17/343,658 filed on Jun. 9, 2021, the contents of which are incorporated fully herein by reference.

TECHNICAL FIELD

Examples set forth in the present disclosure relate to three-dimensional user interfaces with head tracking features. More particularly, but not by way of limitation, the present disclosure describes techniques for providing soft follow and safe pitch angle effects that account for the angular velocity of the user's head movements and the position of the user's head relative to ground for a head-locked augmented reality or virtual reality user interface of an electronic eyewear device.

BACKGROUND

A head mounted electronic eyewear device may be adapted to provide virtual reality (VR) and augmented reality (AR) experiences to a user. To provide a more realistic effect, the head mounted electronic eyewear device may present a three-dimensional user interface that immerses the user into the display environment. The head mounted electronic eyewear device may include head tracking features that adapt the three-dimensional user interface to move as the user moves her head such that the three-dimensional user interface remains positioned in front of the user's eyes during head movement.

BRIEF DESCRIPTION OF THE DRAWINGS

Features of the various implementations disclosed will be readily understood from the following detailed description, in which reference is made to the appended drawing figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1A:
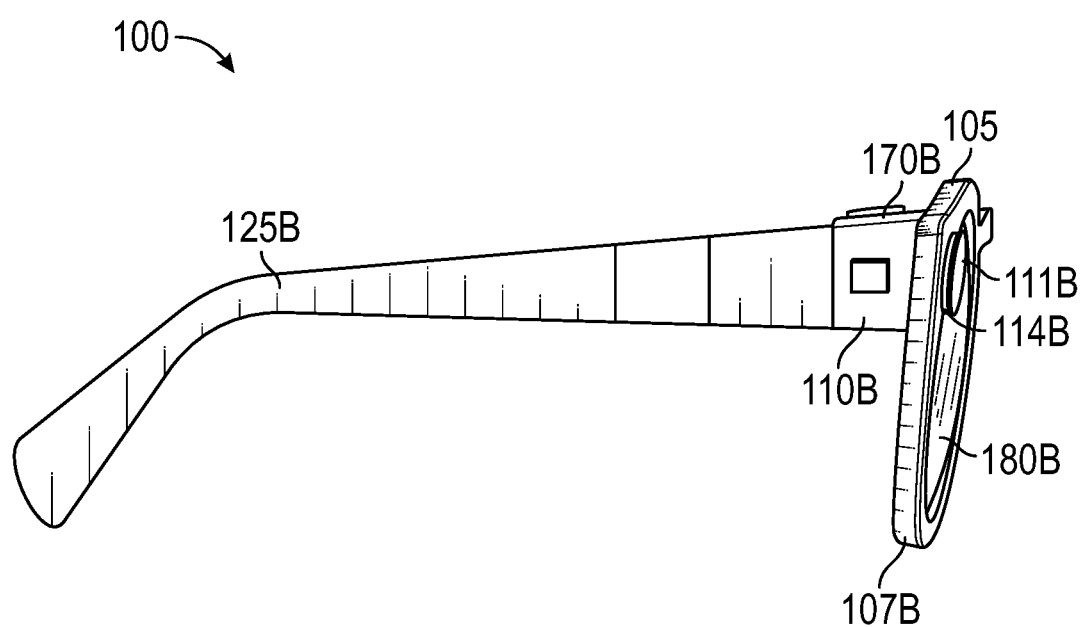
FIG. 1A illustrates a side view of an example hardware configuration of an electronic eyewear device showing a right optical assembly with an image display.

This disclosure is directed to a feature that moves the user interface of electronic eyewear devices to track the user's head movement to keep the user interface in front of the user's eyes. However, rather than tracking the head movement directly, a position forward vector, a rotation forward vector, and an up vector are defined to enable the system to individually adjust the rates of translation and rotation of the user interface independent of the head forward vector to permit individual adjustments of the translation rates and rotation rates of the user interface as the user's head moves through space. By disconnecting the translation and rotation of the user interface from the head forward vector, the rate of translation and rotational movement of the user interface may be separated from the rate of movement of the user's head to enable a delay in user interface movement relative to the head movement for a more realistic VR/AR 3D presentation. Also, the pitch angle may be monitored to maintain the user interface in front of the user's eyes in the correct orientation even at difficult pitch angles such as straight up or straight down by disabling the head movement tracking as the pitch angle approaches straight up or straight down.

This disclosure is thus directed to a system and method for displaying a user interface on a display of an electronic eyewear device adapted to be worn on the head of a user. The method includes determining at least one of a rotation damping constant or a position damping constant for a given render frame rate of the user interface, calculating at least one of a rotation forward vector or a position forward vector for a position of the user interface for a current rendering frame, and rendering the user interface to the display for the current rendering frame at a position of at least one of the calculated position forward vector or the calculated rotation forward vector, whereby at least one of translational or rotational movement of the user interface is delayed relative to movement of the user's head. Calculation of the rotation forward vector includes calculating an angular linear interpolation of the rotation forward vector for a previous frame and a head forward vector of a current frame at a rotation damping specified by the rotation damping constant, while calculation of the position forward vector includes calculating an angular linear interpolation of the position forward vector for the previous frame and a head forward vector of the current frame at a position damping specified by the position damping constant.

The display method may further include determining a pitch angle A of the electronic eyewear device with respect to ground, setting an up vector for the user interface, and rendering the user interface in alignment with the up vector. The up vector is varied depending upon the determined pitch angle. For example, when the pitch angle A is between a minimum pitch angle and a maximum pitch angle, the up vector for the user interface is set as equal to a world up vector relative to ground. On the other hand, when the pitch angle A is between a minimum pitch angle and the minimum pitch angle minus a transition angle or when the pitch angle A is between the maximum pitch angle and the maximum pitch angle plus the transition angle, the up vector for the user interface is set as equal to an interpolated vector between a world up vector relative to ground and a head up vector for a user's head. Then, when the pitch angle approaches ground or straight up (i.e., when the pitch angle A is between a minimum pitch angle minus the transition angle and −(minimum pitch angle minus the transition angle) or when the pitch angle A is between the maximum pitch angle plus the transition angle and −(maximum pitch angle plus the transition angle)), the up vector for the user interface is set as equal to a head up vector for a user's head. Thus, when the pitch angle approaches ground or straight up, the user interface transitions to align with the user's head rather than ground.

The following detailed description includes systems, methods, techniques, instruction sequences, and computer program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and methods described because the relevant teachings can be applied or practiced in a variety of ways. The terminology and nomenclature used herein is for the purpose of describing particular aspects only and is not intended to be limiting. In general, well-known instruction instances, protocols, structures, and techniques are not necessarily shown in detail.

The term "connect," "connected," "couple," and "coupled" as used herein refers to any logical, optical, physical, or electrical connection, including a link or the like by which the electrical or magnetic signals produced or supplied by one system element are imparted to another coupled or connected system element. Unless described otherwise, coupled, or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

The orientations of the electronic eyewear device, associated components and any complete devices incorporating an eye scanner and camera such as shown in any of the drawings, are given by way of example only, for illustration and discussion purposes. In operation for a particular variable optical processing application, the electronic eyewear device may be oriented in any other direction suitable to the particular application of the electronic eyewear device, for example up, down, sideways, or any other orientation. Also, to the extent used herein, any directional term, such as front, rear, inwards, outwards, towards, left, right, lateral, longitudinal, up, down, upper, lower, top, bottom and side, are used by way of example only, and are not limiting as to direction or orientation of any optic or component of an optic constructed as otherwise described herein.

Reference now is made in detail to the examples illustrated in the accompanying drawings and discussed below. A sample electronic eyewear device that implements soft follow and safe pitch angle effects that account for the angular velocity of the user's head movements and the position of the user's head relative to ground for a head-locked augmented reality or virtual reality user interface of an electronic eyewear device will be described with respect to FIGS. 1-13.

Figure 2A:
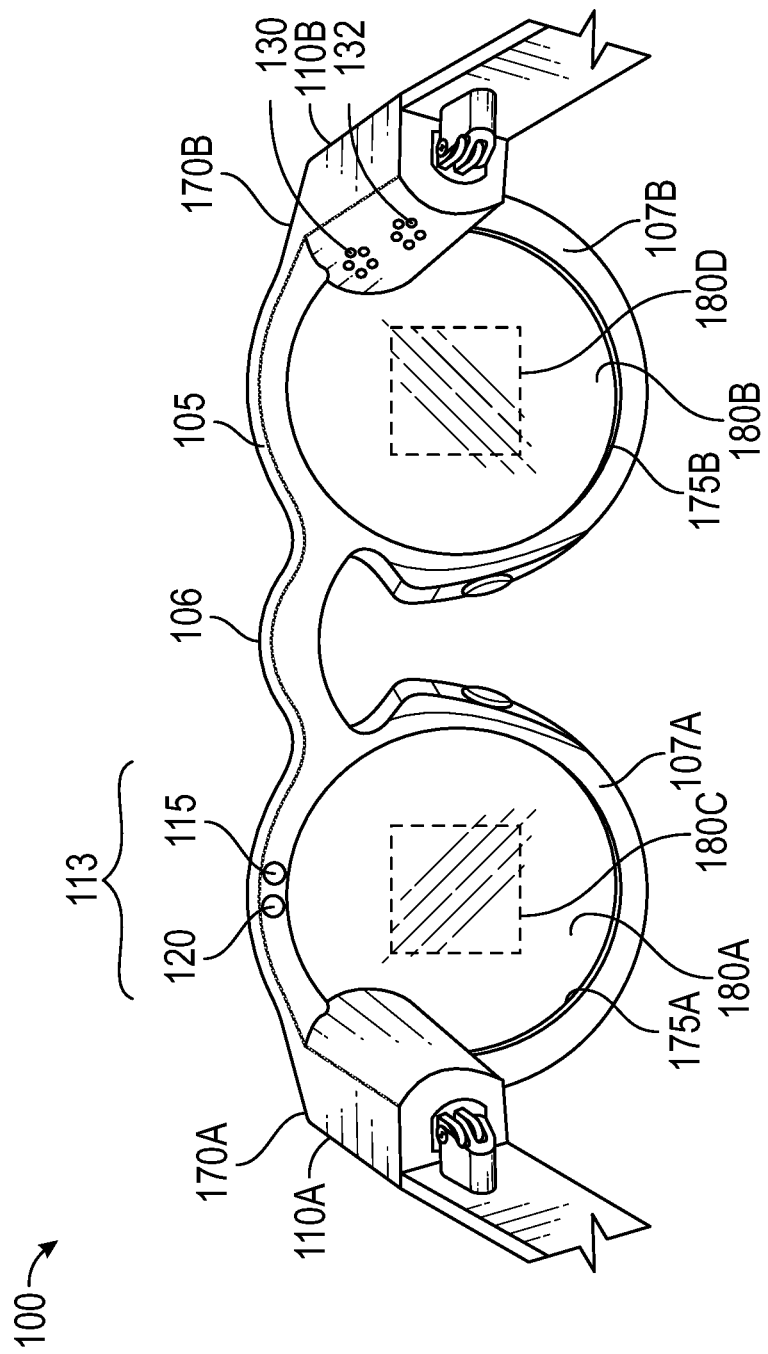
FIG. 2A illustrates a rear view of an example hardware configuration of an electronic eyewear device in an example hardware configuration.

FIG. 1A illustrates a side view of an example hardware configuration of an electronic eyewear device 100 including a right optical assembly 180B with an image display 180D (FIG. 2A). Electronic eyewear device 100 includes multiple visible light cameras 114A-B (FIG. 5) that form a stereo camera, of which the right visible light camera 114B is located on a right temple 110B and the left visible light camera 114A is located on a left temple 110A.

The left and right visible light cameras 114A-B may include an image sensor that is sensitive to the visible light range wavelength. Each of the visible light cameras 114A-B has a different frontward facing angle of coverage, for example, visible light camera 114B has the depicted angle of coverage 111B. The angle of coverage is an angle range in which the image sensor of the visible light camera 114A-B picks up electromagnetic radiation and generates images. Examples of such visible lights camera 114A-B include a high-resolution complementary metal-oxide-semiconductor (CMOS) image sensor and a video graphic array (VGA) camera, such as 640*p* (e.g., 640×480 pixels for a total of 0.3 megapixels), 720p, or 1080p. Image sensor data from the visible light cameras 114A-B may be captured along with geolocation data, digitized by an image processor, and stored in a memory.

To provide stereoscopic vision, visible light cameras 114A-B may be coupled to an image processor (element 612 of FIG. 6) for digital processing along with a timestamp in which the image of the scene is captured. Image processor 612 may include circuitry to receive signals from the visible light camera 114A-B and to process those signals from the visible light cameras 114A-B into a format suitable for storage in the memory (element 634 of FIG. 6). The timestamp may be added by the image processor 612 or other processor that controls operation of the visible light cameras 114A-B. Visible light cameras 114A-B allow the stereo camera to simulate human binocular vision. Stereo cameras also provide the ability to reproduce three-dimensional images (image 515 of FIG. 5) based on two captured images (elements 558A-B of FIG. 5) from the visible light cameras 114A-B, respectively, having the same timestamp. Such three-dimensional images 515 allow for an immersive lifelike experience, e.g., for virtual reality or video gaming. For stereoscopic vision, the pair of images 558A-B may be generated at a given moment in time—one image for each of the left and right visible light cameras 114A-B. When the pair of generated images 558A-B from the frontward facing field of view (FOV) 111A-B of the left and right visible light cameras 114A-B are stitched together (e.g., by the image processor 612), depth perception is provided by the optical assembly 180A-B.

In an example, the electronic eyewear device 100 includes a frame 105, a right rim 107B, a right temple 110B extending from a right lateral side 170B of the frame 105, and a see-through image display 180D (FIGS. 2A-B) comprising optical assembly 180B to present a graphical user interface to a user. The electronic eyewear device 100 includes the left visible light camera 114A connected to the frame 105 or the left temple 110A to capture a first image of the scene. Electronic eyewear device 100 further includes the right visible light camera 114B connected to the frame 105 or the right temple 110B to capture (e.g., simultaneously with the left visible light camera 114A) a second image of the scene which partially overlaps the first image. Although not shown in FIGS. 1A-B, a processor 632 (FIG. 6) is coupled to the electronic eyewear device 100 and connected to the visible light cameras 114A-B and memory 634 (FIG. 6) accessible to the processor 632, and programming in the memory 634 may be provided in the electronic eyewear device 100 itself.

Figure 1B:
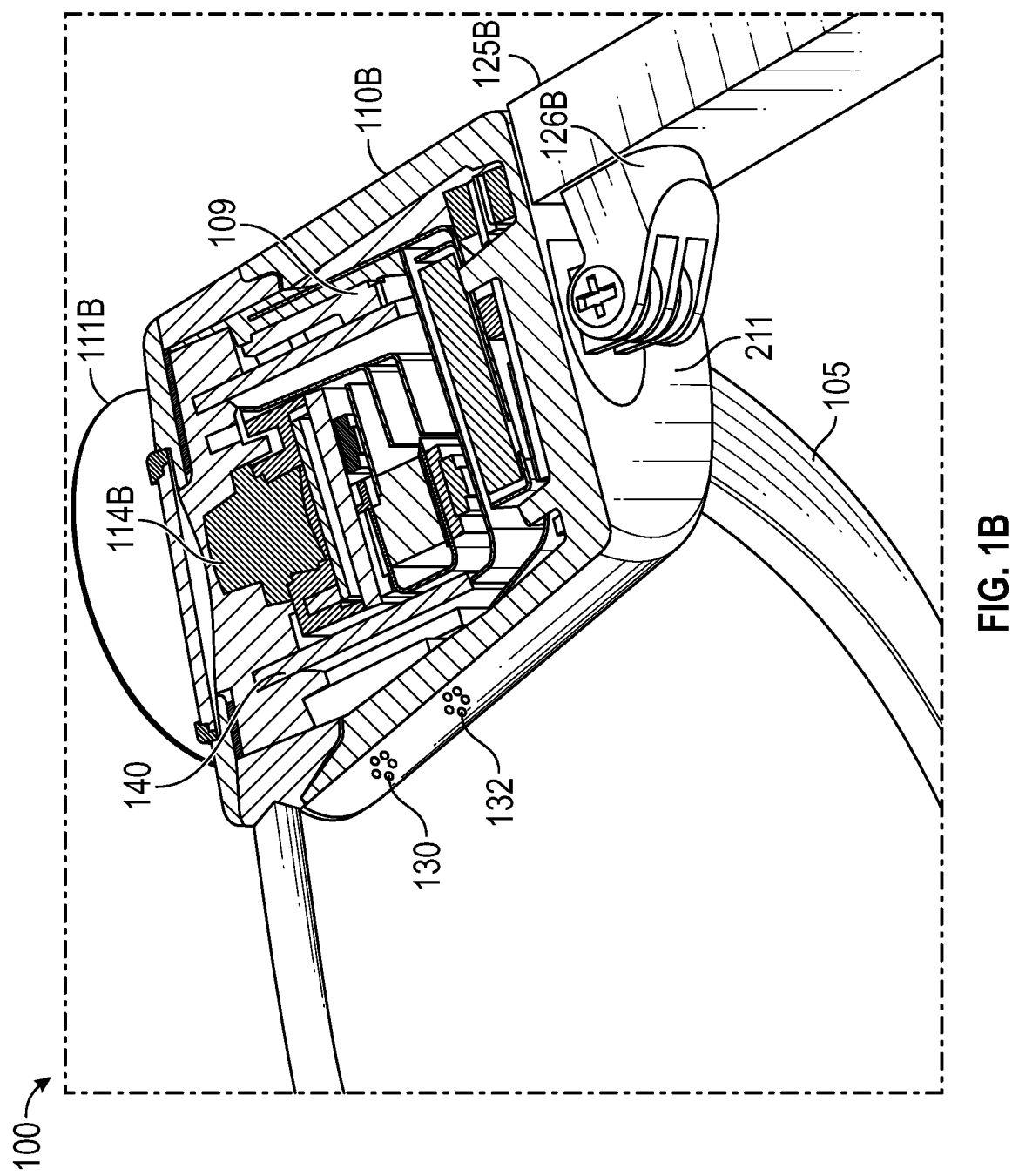
FIG. 1B illustrates a top cross-sectional view of a temple of the electronic eyewear device of FIG. 1A.
Figure 2B:
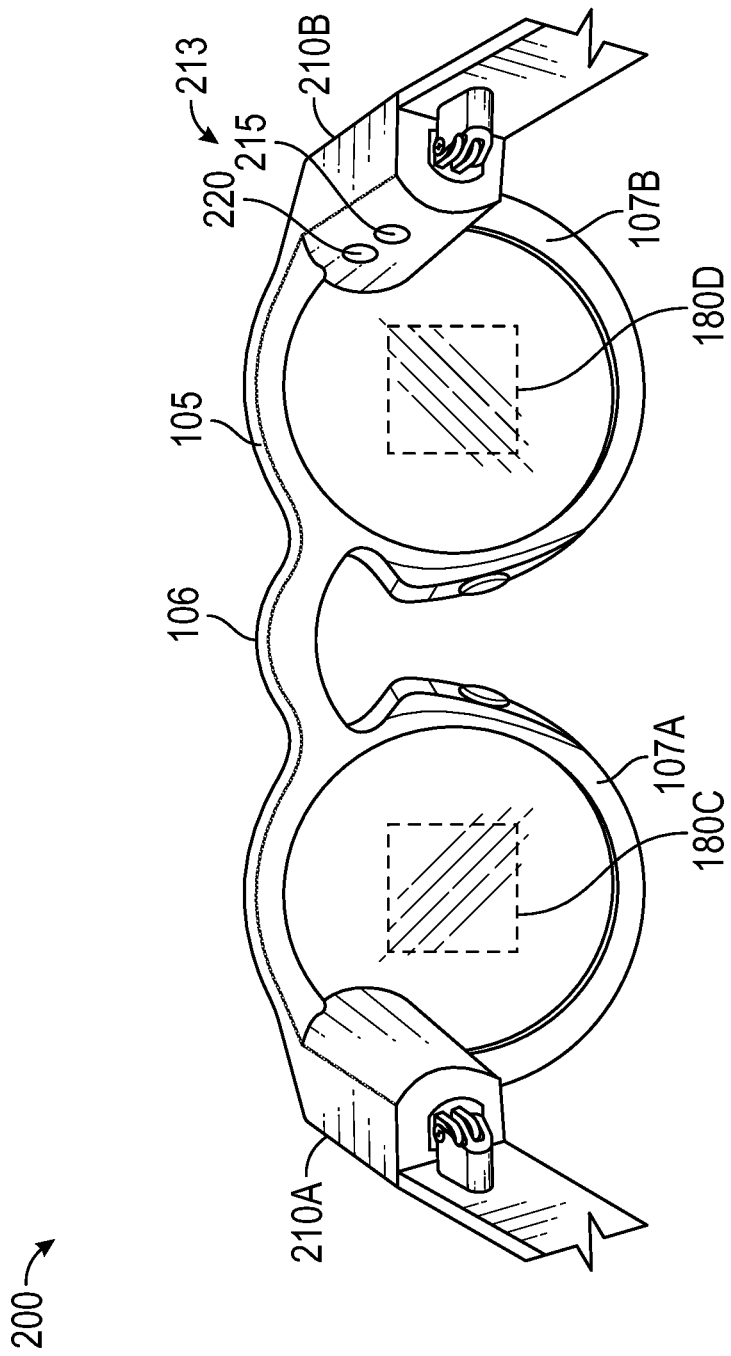
FIG. 2B illustrates a rear view of an example hardware configuration of another electronic eyewear device in an example hardware configuration.
Figure 2C:
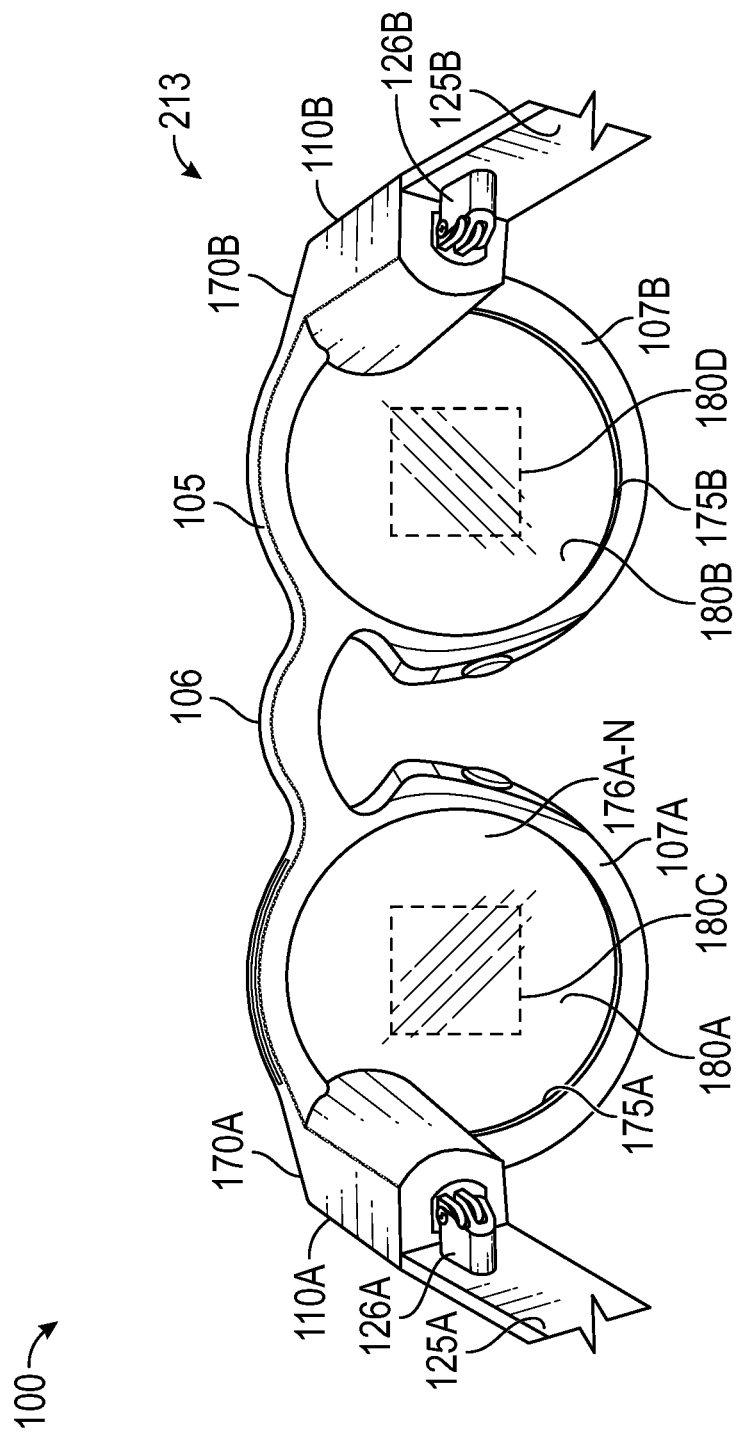
FIG. 2C and FIG. 2D illustrate rear views of example hardware configurations of an electronic eyewear device including two different types of image displays.

Although not shown in FIG. 1A, the electronic eyewear device 100 also may include a head movement tracker (element 109 of FIG. 1B) or an eye movement tracker (element 113 of FIG. 2A or element 213 of FIGS. 2B-C). Electronic eyewear device 100 may further include the see-through image displays 180C-D of optical assembly 180A-B, respectfully, for presenting a sequence of displayed images, and an image display driver (element 642 of FIG. 6) coupled to the see-through image displays 180C-D of optical assembly 180A-B to control the image displays 180C-D of optical assembly 180A-B to present the sequence of displayed images 515, which are described in further detail below. Electronic eyewear device 100 may further include the memory 634 and the processor 632 having access to the image display driver 642 and the memory 634, as well as programming in the memory 634. Execution of the programming by the processor 632 configures the electronic eyewear device 100 to perform functions, including functions to present, via the see-through image displays 180C-D, an initial displayed image of the sequence of displayed images, the initial displayed image having an initial field of view corresponding to an initial head direction or an initial eye gaze direction 230.

Execution of the programming by the processor 632 may further configure the electronic eyewear device 100 to detect movement of a user of the electronic eyewear device 100 by: (i) tracking, via the head movement tracker (element 109 of FIG. 1B), a head movement of a head of the user, or (ii) tracking, via an eye movement tracker (element 113 of FIG. 2A or element 213 of FIGS. 2B-C), an eye movement of an eye of the user of the electronic eyewear device 100. Execution of the programming by the processor 632 may further configure the electronic eyewear device 100 to determine a field of view adjustment to the initial field of view of the initial displayed image based on the detected movement of the user. The field of view adjustment may include a successive field of view corresponding to a successive head direction or a successive eye direction. Execution of the programming by the processor 632 may further configure the electronic eyewear device 100 to generate a successive displayed image of the sequence of displayed images based on the field of view adjustment. Execution of the programming by the processor 632 may further configure the electronic eyewear device 100 to present, via the see-through image displays 180C-D of the optical assembly 180A-B, the successive displayed images.

FIG. 1B illustrates a top cross-sectional view of the temple of the electronic eyewear device 100 of FIG. 1A depicting the right visible light camera 114B, a head movement tracker 109, and a circuit board 140. Construction and placement of the left visible light camera 114A is substantially similar to the right visible light camera 114B, except the connections and coupling are on the left lateral side 170A (FIG. 2A). As shown, the electronic eyewear device 100 includes the right visible light camera 114B and a circuit board, which may be a flexible printed circuit board (PCB) 140. The right hinge 126B connects the right temple 110B to hinged arm 125B of the electronic eyewear device 100. In some examples, components of the right visible light camera 114B, the flexible PCB 140, or other electrical connectors or contacts may be located on the right temple 110B or the right hinge 126B.

As shown, electronic eyewear device 100 may include a head movement tracker 109, which includes, for example, an inertial measurement unit (IMU). An inertial measurement unit is an electronic device that measures and reports a body's specific force, angular rate, and sometimes the magnetic field surrounding the body, using a combination of accelerometers and gyroscopes, sometimes also magnetometers. The inertial measurement unit works by detecting linear acceleration using one or more accelerometers and rotational rate using one or more gyroscopes. Typical configurations of inertial measurement units contain one accelerometer, gyro, and magnetometer per axis for each of the three axes: horizontal axis for left-right movement (X), vertical axis (Y) for top-bottom movement, and depth or distance axis for up-down movement (Z). The accelerometer detects the gravity vector. The magnetometer defines the rotation in the magnetic field (e.g., facing south, north, etc.) like a compass that generates a heading reference. The three accelerometers detect acceleration along the horizontal, vertical, and depth axis defined above, which can be defined relative to the ground, the electronic eyewear device 100, or the user wearing the electronic eyewear device 100.

Electronic eyewear device 100 may detect movement of the user of the electronic eyewear device 100 by tracking, via the head movement tracker 109, the head movement of the head of the user. The head movement includes a variation of head direction on a horizontal axis, a vertical axis, or a combination thereof from the initial head direction during presentation of the initial displayed image on the image display. In one example, tracking, via the head movement tracker 109, the head movement of the head of the user includes measuring, via the inertial measurement unit 109, the initial head direction on the horizontal axis (e.g., X axis), the vertical axis (e.g., Y axis), or the combination thereof (e.g., transverse or diagonal movement). Tracking, via the head movement tracker 109, the head movement of the head of the user further includes measuring, via the inertial measurement unit 109, a successive head direction on the horizontal axis, the vertical axis, or the combination thereof during presentation of the initial displayed image.

Tracking, via the head movement tracker 109, the head movement of the head of the user may further include determining the variation of head direction based on both the initial head direction and the successive head direction. Detecting movement of the user of the electronic eyewear device 100 may further include in response to tracking, via the head movement tracker 109, the head movement of the head of the user, determining that the variation of head direction exceeds a deviation angle threshold on the horizontal axis, the vertical axis, or the combination thereof. In sample configurations, the deviation angle threshold is between about 3° to 10°. As used herein, the term "about" when referring to an angle means±10% from the stated amount.

Variation along the horizontal axis slides three-dimensional objects, such as characters, Bitmojis, application icons, etc. in and out of the field of view by, for example, hiding, unhiding, or otherwise adjusting visibility of the three-dimensional object. Variation along the vertical axis, for example, when the user looks upwards, in one example, displays weather information, time of day, date, calendar appointments, etc. In another example, when the user looks downwards on the vertical axis, the electronic eyewear device 100 may power down.

As shown in FIG. 1B, the right temple 110B includes temple body 211 and a temple cap, with the temple cap omitted in the cross-section of FIG. 1B. Disposed inside the right temple 110B are various interconnected circuit boards, such as PCBs or flexible PCBs 140, that include controller circuits for right visible light camera 114B, microphone(s) 130, speaker(s) 132, low-power wireless circuitry (e.g., for wireless short-range network communication via BLUETOOTH®), and high-speed wireless circuitry (e.g., for wireless local area network communication via WI-FI®).

The right visible light camera 114B is coupled to or disposed on the flexible PCB 140 and covered by a visible light camera cover lens, which is aimed through opening(s) formed in the right temple 110B. In some examples, the frame 105 connected to the right temple 110B includes the opening(s) for the visible light camera cover lens. The frame 105 may include a front-facing side configured to face outwards away from the eye of the user. The opening for the visible light camera cover lens may be formed on and through the front-facing side. In the example, the right visible light camera 114B has an outward facing angle of coverage 111B with a line of sight or perspective of the right eye of the user of the electronic eyewear device 100. The visible light camera cover lens also can be adhered to an outward facing surface of the right temple 110B in which an opening is formed with an outwards facing angle of coverage, but in a different outwards direction. The coupling can also be indirect via intervening components.

Left (first) visible light camera 114A may be connected to the left see-through image display 180C of left optical assembly 180A to generate a first background scene of a first successive displayed image. The right (second) visible light camera 114B may be connected to the right see-through image display 180D of right optical assembly 180B to generate a second background scene of a second successive displayed image. The first background scene and the second background scene may partially overlap to present a three-dimensional observable area of the successive displayed image.

Flexible PCB 140 may be disposed inside the right temple 110B and coupled to one or more other components housed in the right temple 110B. Although shown as being formed on the circuit boards 140 of the right temple 110B, the right visible light camera 114B can be formed on the circuit boards 140 of the left temple 110A, the hinged arms 125A-B, or frame 105.

FIG. 2A illustrates a rear view of an example hardware configuration of an electronic eyewear device 100. As shown in FIG. 2A, the electronic eyewear device 100 is in a form configured for wearing by a user, which are eyeglasses in the example of FIG. 2A. The electronic eyewear device 100 can take other forms and may incorporate other types of frameworks, for example, a headgear, a headset, or a helmet.

In the eyeglasses example, electronic eyewear device 100 includes the frame 105 which includes the left rim 107A connected to the right rim 107B via the bridge 106 adapted for a nose of the user. The left and right rims 107A-B include respective apertures 175A-B which hold the respective optical element 180A-B, such as a lens and the see-through displays 180C-D. As used herein, the term lens is meant to cover transparent or translucent pieces of glass or plastic having curved and flat surfaces that cause light to converge/diverge or that cause little or no convergence/divergence.

Although shown as having two optical elements 180A-B, the electronic eyewear device 100 can include other arrangements, such as a single optical element depending on the application or intended user of the electronic eyewear device 100. As further shown, electronic eyewear device 100 includes the left temple 110A adjacent the left lateral side 170A of the frame 105 and the right temple 110B adjacent the right lateral side 170B of the frame 105. The temples 110A-B may be integrated into the frame 105 on the respective sides 170A-B (as illustrated) or implemented as separate components attached to the frame 105 on the respective sides 170A-B. Alternatively, the temples 110A-B may be integrated into hinged arms 125A-B attached to the frame 105.

In the example of FIG. 2A, an eye scanner 113 may be provided that includes an infrared emitter 115 and an infrared camera 120. Visible light cameras typically include a blue light filter to block infrared light detection. In an example, the infrared camera 120 is a visible light camera, such as a low-resolution video graphic array (VGA) camera (e.g., 640×480 pixels for a total of 0.3 megapixels), with the blue filter removed. The infrared emitter 115 and the infrared camera 120 may be co-located on the frame 105. For example, both are shown as connected to the upper portion of the left rim 107A. The frame 105 or one or more of the left and right temples 110A-B may include a circuit board (not shown) that includes the infrared emitter 115 and the infrared camera 120. The infrared emitter 115 and the infrared camera 120 can be connected to the circuit board by soldering, for example.

Other arrangements of the infrared emitter 115 and infrared camera 120 may be implemented, including arrangements in which the infrared emitter 115 and infrared camera 120 are both on the right rim 107B, or in different locations on the frame 105. For example, the infrared emitter 115 may be on the left rim 107A and the infrared camera 120 may be on the right rim 107B. In another example, the infrared emitter 115 may be on the frame 105 and the infrared camera 120 may be on one of the temples 110A-B, or vice versa. The infrared emitter 115 can be connected essentially anywhere on the frame 105, left temple 110A, or right temple 110B to emit a pattern of infrared light. Similarly, the infrared camera 120 can be connected essentially anywhere on the frame 105, left temple 110A, or right temple 110B to capture at least one reflection variation in the emitted pattern of infrared light.

The infrared emitter 115 and infrared camera 120 may be arranged to face inwards towards an eye of the user with a partial or full field of view of the eye in order to identify the respective eye position and gaze direction. For example, the infrared emitter 115 and infrared camera 120 may be positioned directly in front of the eye, in the upper part of the frame 105 or in the temples 110A-B at either ends of the frame 105.

FIG. 2B illustrates a rear view of an example hardware configuration of another electronic eyewear device 200. In this example configuration, the electronic eyewear device 200 is depicted as including an eye scanner 213 on a right temple 210B. As shown, an infrared emitter 215 and an infrared camera 220 are co-located on the right temple 210B. It should be understood that the eye scanner 213 or one or more components of the eye scanner 213 can be located on the left temple 210A and other locations of the electronic eyewear device 200, for example, the frame 105. The infrared emitter 215 and infrared camera 220 are like that of FIG. 2A, but the eye scanner 213 can be varied to be sensitive to different light wavelengths as described previously in FIG. 2A. Similar to FIG. 2A, the electronic eyewear device 200 includes a frame 105 which includes a left rim 107A which is connected to a right rim 107B via a bridge 106. The left and right rims 107A-B may include respective apertures which hold the respective optical elements 180A-B comprising the see-through display 180C-D.

Figure 2D:
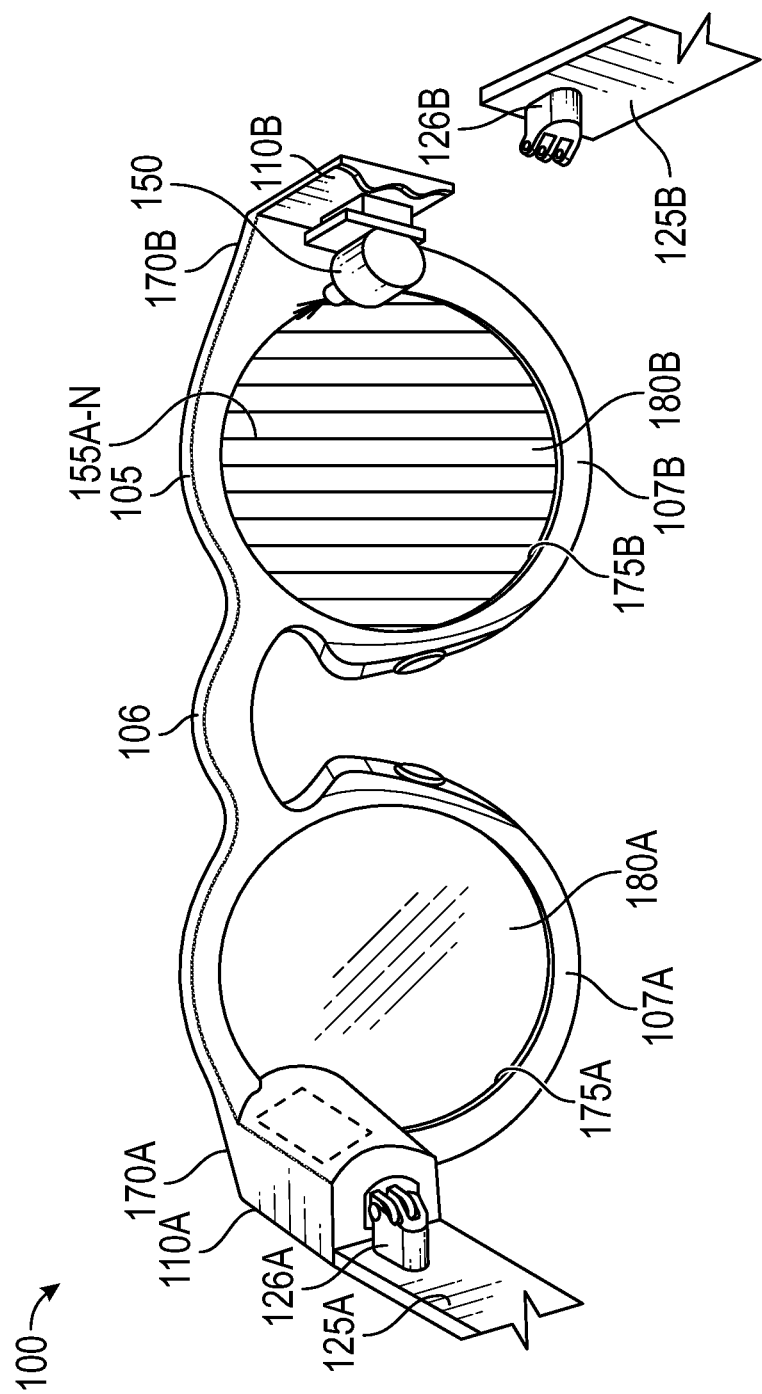

FIGS. 2C-D illustrate rear views of example hardware configurations of the electronic eyewear device 100, including two different types of see-through image displays 180C-D. In one example, these see-through image displays 180C-D of optical assembly 180A-B include an integrated image display. As shown in FIG. 2C, the optical assemblies 180A-B include a suitable display matrix 180C-D of any suitable type, such as a liquid crystal display (LCD), an organic light-emitting diode (OLED) display, a waveguide display, or any other such display.

The optical assembly 180A-B also includes an optical layer or layers 176, which can include lenses, optical coatings, prisms, mirrors, waveguides, optical strips, and other optical components in any combination. The optical layers 176A-N can include a prism having a suitable size and configuration and including a first surface for receiving light from display matrix and a second surface for emitting light to the eye of the user. The prism of the optical layers 176A-N may extend over all or at least a portion of the respective apertures 175A-B formed in the left and right rims 107A-B to permit the user to see the second surface of the prism when the eye of the user is viewing through the corresponding left and right rims 107A-B. The first surface of the prism of the optical layers 176A-N faces upwardly from the frame 105 and the display matrix overlies the prism so that photons and light emitted by the display matrix impinge the first surface. The prism may be sized and shaped so that the light is refracted within the prism and is directed towards the eye of the user by the second surface of the prism of the optical layers 176A-N. In this regard, the second surface of the prism of the optical layers 176A-N can be convex to direct the light towards the center of the eye. The prism can optionally be sized and shaped to magnify the image projected by the see-through image displays 180C-D, and the light travels through the prism so that the image viewed from the second surface is larger in one or more dimensions than the image emitted from the see-through image displays 180C-D.

In another example, the see-through image displays 180C-D of optical assembly 180A-B may include a projection image display as shown in FIG. 2D. The optical assembly 180A-B includes a projector 150, which may be a three-color projector using a scanning mirror, a galvanometer, a laser projector, or other types of projectors. During operation, an optical source such as a projector 150 is disposed in or on one of the temples 110A-B of the electronic eyewear device 100. Optical assembly 180-B may include one or more optical strips 155A-N spaced apart across the width of the lens of the optical assembly 180A-B or across a depth of the lens between the front surface and the rear surface of the lens.

As the photons projected by the projector 150 travel across the lens of the optical assembly 180A-B, the photons encounter the optical strips 155A-N. When a particular photon encounters a particular optical strip, the photon is either redirected towards the user's eye, or it passes to the next optical strip. A combination of modulation of projector 150, and modulation of optical strips, may control specific photons or beams of light. In an example, a processor controls optical strips 155A-N by initiating mechanical, acoustic, or electromagnetic signals. Although shown as having two optical assemblies 180A-B, the electronic eyewear device 100 can include other arrangements, such as a single or three optical assemblies, or the optical assembly 180A-B may have arranged different arrangement depending on the application or intended user of the electronic eyewear device 100.

As further shown in FIGS. 2C-D, electronic eyewear device 100 includes a left temple 110A adjacent the left lateral side 170A of the frame 105 and a right temple 110B adjacent the right lateral side 170B of the frame 105. The temples 110A-B may be integrated into the frame 105 on the respective lateral sides 170A-B (as illustrated) or implemented as separate components attached to the frame 105 on the respective sides 170A-B. Alternatively, the temples 110A-B may be integrated into the hinged arms 125A-B attached to the frame 105.

In one example, the see-through image displays include the first see-through image display 180C and the second see-through image display 180D. Electronic eyewear device 100 may include first and second apertures 175A-B that hold the respective first and second optical assembly 180A-B.

The first optical assembly 180A may include the first see-through image display 180C (e.g., a display matrix of FIG. 2C or optical strips 155A-N' and a projector 150A (not shown) in left temple 110A). The second optical assembly 180B may include the second see-through image display 180D (e.g., a display matrix of FIG. 2C or optical strips 155A-N" and a projector 150B (not shown) in right temple 110B). The successive field of view of the successive displayed image may include an angle of view between about 150 to 30, and more specifically 24°, measured horizontally, vertically, or diagonally. The successive displayed image having the successive field of view represents a combined three-dimensional observable area visible through stitching together of two displayed images presented on the first and second image displays.

As used herein, "an angle of view" describes the angular extent of the field of view associated with the displayed images presented on each of the left and right image displays 180C-D of optical assembly 180A-B. The "angle of coverage" describes the angle range that a lens of visible light cameras 114A-B or infrared camera 220 can image. Typically, the image circle produced by a lens is large enough to cover the film or sensor completely, possibly including some vignetting (i.e., a reduction of an image's brightness or saturation toward the periphery compared to the image center). If the angle of coverage of the lens does not fill the sensor, the image circle will be visible, typically with strong vignetting toward the edge, and the effective angle of view will be limited to the angle of coverage. The "field of view" is intended to describe the field of observable area which the user of the electronic eyewear device 100 can see through his or her eyes via the displayed images presented on the left and right image displays 180C-D of the optical assembly 180A-B. Image display 180C of optical assembly 180A-B can have a field of view with an angle of coverage between 15° to 30°, for example 24°, and have a resolution of 480×480 pixels.

Figure 3:
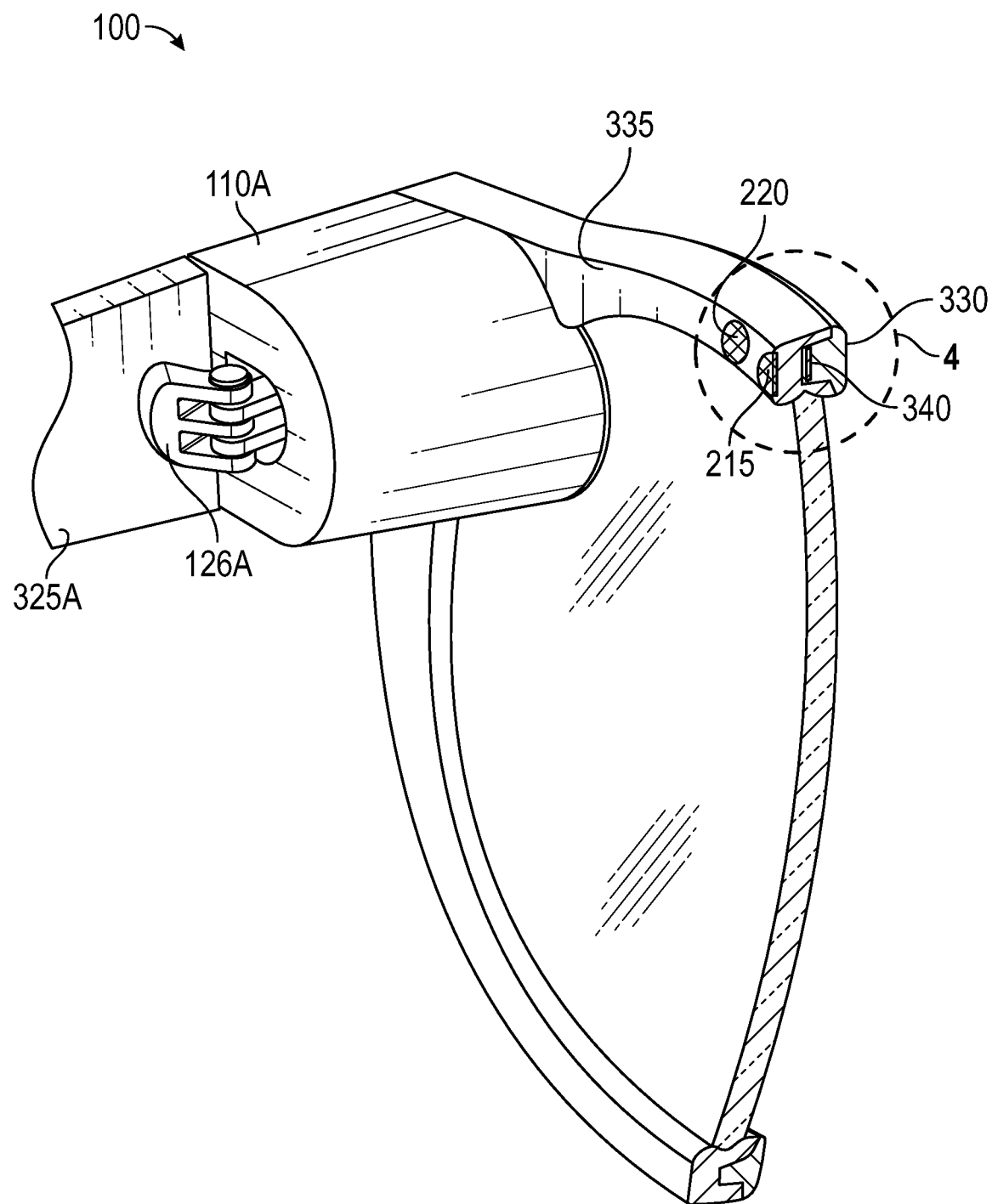
FIG. 3 illustrates a rear perspective view of the electronic eyewear device of FIG. 2A depicting an infrared emitter, an infrared camera, a frame front, a frame back, and a circuit board.

FIG. 3 illustrates a rear perspective view of the electronic eyewear device 100 of FIG. 2A. The electronic eyewear device 100 includes an infrared emitter 215, infrared camera 220, a frame front 330, a frame back 335, and a circuit board 340. It can be seen in FIG. 3 that the upper portion of the left rim of the frame of the electronic eyewear device 100 may include the frame front 330 and the frame back 335. An opening for the infrared emitter 215 is formed on the frame back 335.

As shown in the encircled cross-section 4 in the upper middle portion of the left rim of the frame, a circuit board, which may be a flexible PCB 340, is sandwiched between the frame front 330 and the frame back 335. Also shown in further detail is the attachment of the left temple 110A to the left hinged arm 325A via the left hinge 126A. In some examples, components of the eye movement tracker 213, including the infrared emitter 215, the flexible PCB 340, or other electrical connectors or contacts may be located on the left hinged arm 325A or the left hinge 126A.

Figure 4:
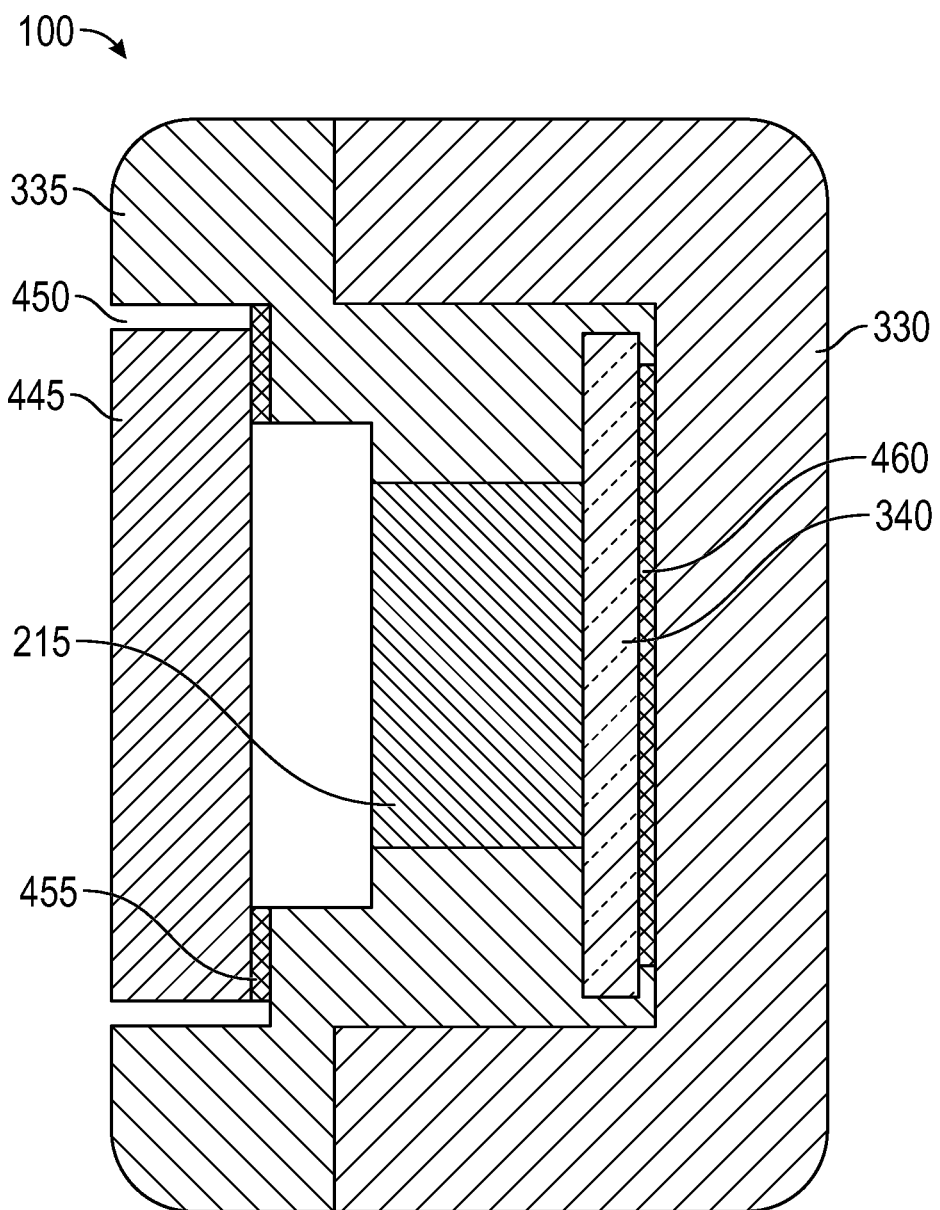
FIG. 4 illustrates a cross-sectional view taken through the infrared emitter and the frame of the electronic eyewear device of FIG. 3.

FIG. 4 is a cross-sectional view through the infrared emitter 215 and the frame corresponding to the encircled cross-section 4 of the electronic eyewear device 100 of FIG. 3. Multiple layers of the electronic eyewear device 100 are illustrated in the cross-section of FIG. 4. As shown, the frame includes the frame front 330 and the frame back 335. The flexible PCB 340 is disposed on the frame front 330 and connected to the frame back 335. The infrared emitter 215 is disposed on the flexible PCB 340 and covered by an infrared emitter cover lens 445. For example, the infrared emitter 215 may be reflowed to the back of the flexible PCB 340. Reflowing attaches the infrared emitter 215 to contact pad(s) formed on the back of the flexible PCB 340 by subjecting the flexible PCB 340 to controlled heat which melts a solder paste to connect the two components. In one example, reflowing is used to surface mount the infrared emitter 215 on the flexible PCB 340 and electrically connect the two components. However, it should be understood that through-holes can be used to connect leads from the infrared emitter 215 to the flexible PCB 340 via interconnects, for example.

The frame back 335 may include an infrared emitter opening 450 for the infrared emitter cover lens 445. The infrared emitter opening 450 is formed on a rear-facing side of the frame back 335 that is configured to face inwards towards the eye of the user. In the example, the flexible PCB 340 can be connected to the frame front 330 via the flexible PCB adhesive 460. The infrared emitter cover lens 445 can be connected to the frame back 335 via infrared emitter cover lens adhesive 455. The coupling also can be indirect via intervening components.

Figure 5:
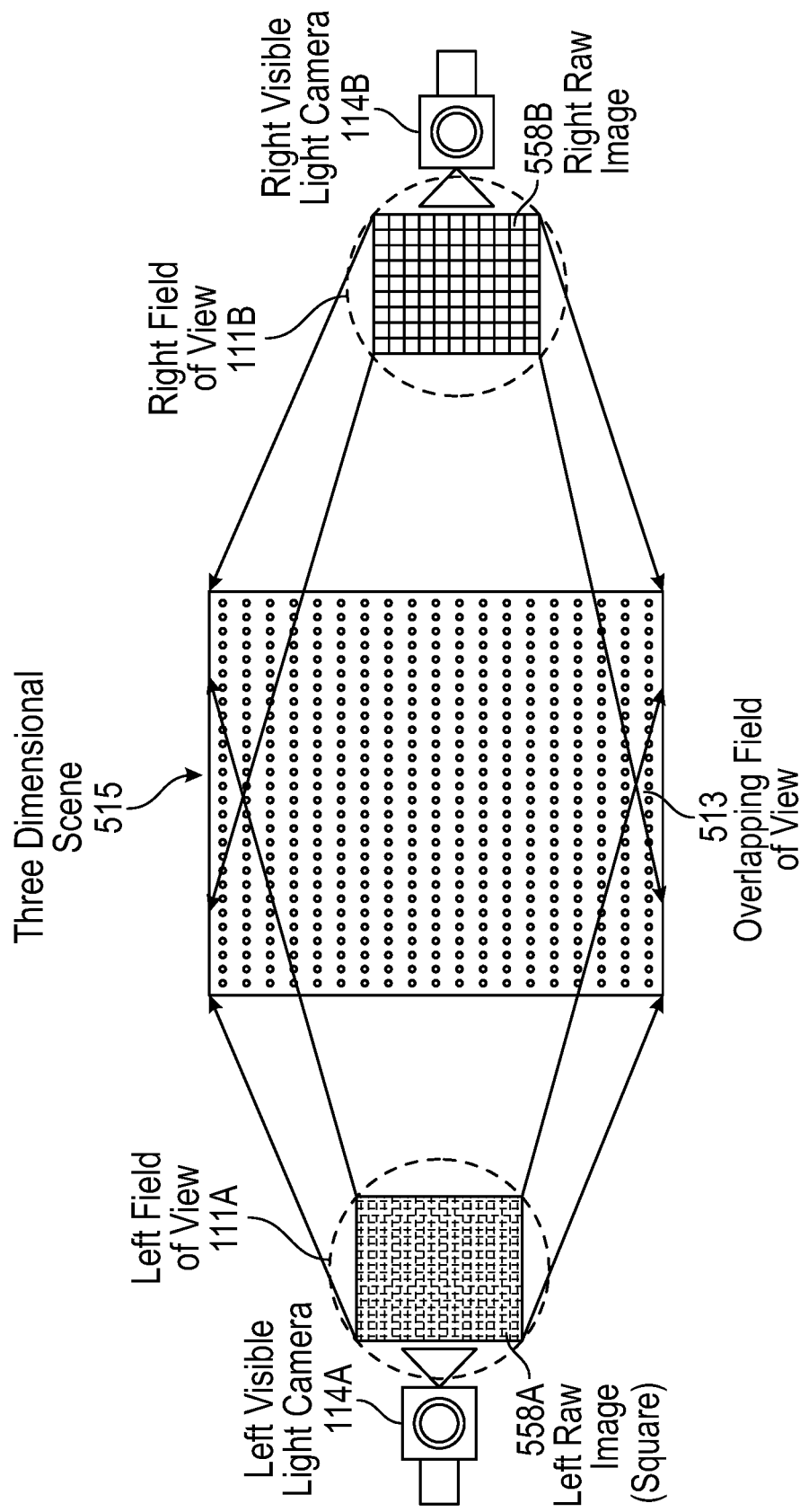
FIG. 5 illustrates an example of visible light captured by the left visible light camera as a left raw image and visible light captured by the right visible light camera as a right raw image.

FIG. 5 illustrates an example of capturing visible light with cameras 114A-B.

Figure 6:
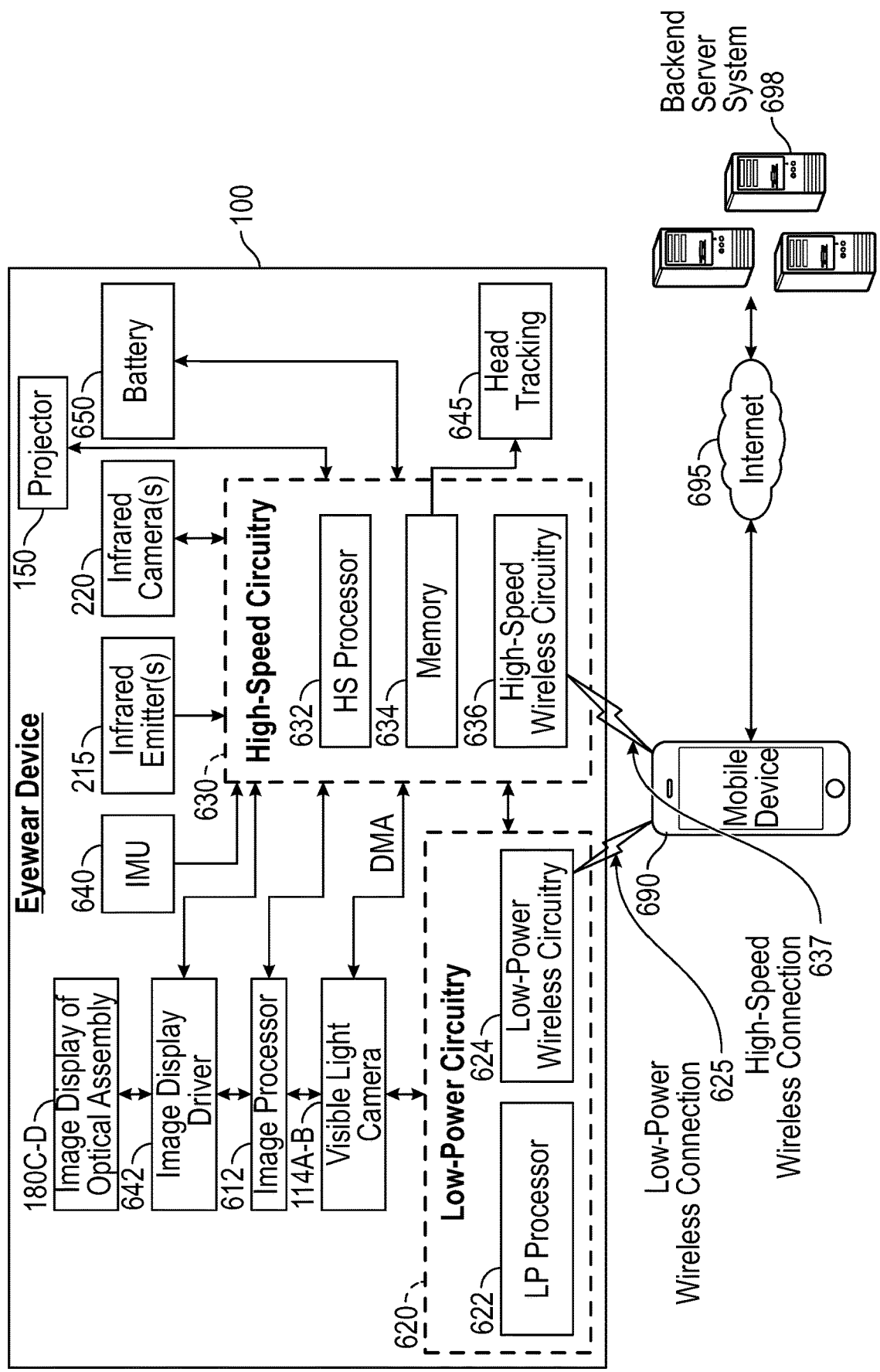
FIG. 6 illustrates a block diagram of electronic components of the electronic eyewear device.

Visible light is captured by the left visible light camera 114A with a round field of view (FOV). 111A. A chosen rectangular left raw image 558A is used for image processing by image processor 612 (FIG. 6). Visible light is also captured by the right visible light camera 114B with a round FOV 111B. A rectangular right raw image 558B chosen by the image processor 612 is used for image processing by processor 612. Based on processing of the left raw image 558A and the right raw image 558B having an overlapping field of view 513, a three-dimensional image 515 of a three-dimensional scene, referred to hereafter as an immersive image, is generated by processor 612 and displayed by displays 180C and 180D and which is viewable by the user.

FIG. 6 illustrates a high-level functional block diagram including example electronic components disposed in electronic eyewear device 100 or 200. The illustrated electronic components include the processor 632, the memory 634, and the see-through image display 180C and 180D.

Memory 634 includes instructions for execution by processor 632 to implement the functionality of electronic eyewear devices 100 and 200, including instructions for processor 632 to control in the image 515. Processor 632 receives power from battery 650 and executes the instructions stored in memory 634, or integrated with the processor 632 on-chip, to perform the functionality of electronic eyewear devices 100 and 200 and to communicate with external devices via wireless connections.

The electronic eyewear devices 100 and 200 may incorporate a head movement tracker 645 and may provide user interface adjustments such as a soft follow effect that accounts for the angular velocity of the user's head movements for a head-locked augmented reality or virtual reality user interface of an electronic eyewear device 100 or 200 as described in more detail below. The head movement tracker 645 may be implemented by a processor of the electronic eyewear device (e.g., processor 632) or may be implemented on a remote processing device such as the user's mobile device 690. Mobile device 690 may be a smartphone, tablet, laptop computer, access point, or any other such device capable of connecting with the electronic eyewear devices 100 or 200 using both a low-power wireless connection 625 and a high-speed wireless connection 637. Mobile device 690 is further connected to server system 698 via a network 695. The network 695 may include any combination of wired and wireless connections.

Electronic eyewear devices 100 and 200 may include at least two visible light cameras 114A-B (one associated with the left lateral side 170A and one associated with the right lateral side 170B). Electronic eyewear devices 100 and 200 further include two see-through image displays 180C-D of the optical assembly 180A-B (one associated with the left lateral side 170A and one associated with the right lateral side 170B). Electronic eyewear devices 100 and 200 also include image display driver 642, image processor 612, low-power circuitry 620, and high-speed circuitry 630. The components shown in FIG. 6 for the electronic eyewear devices 100 and 200 are located on one or more circuit boards, for example, a PCB or flexible PCB 140, in the temples. Alternatively, or additionally, the depicted components can be located in the temples, frames, hinges, hinged arms, or bridge of the electronic eyewear devices 100 and 200. Left and right visible light cameras 114A-B can include digital camera elements such as a complementary metal-oxide-semiconductor (CMOS) image sensor, charge coupled device, a lens, or any other respective visible or light capturing elements that may be used to capture data, including images of scenes with unknown objects.

Head movement tracking programming 645 implements the user interface field of view adjustment instructions, including instructions to cause the electronic eyewear devices 100 or 200 to track, using the inertial measurement unit 640 (e.g., inertial measurement unit 109 described above), the movement of the head of the user of the electronic eyewear devices 100 or 200 as described above and in further detail below. Other implemented instructions (functions) cause the electronic eyewear devices 100 and 200 to determine the FOV adjustment to the initial FOV 111A-B based on the detected eye movement of the user corresponding to a successive eye direction. Further implemented instructions generate a successive displayed image of the sequence of displayed images based on the field of view adjustment. The successive displayed image is produced as visible output to the user via the user interface. This visible output appears on the see-through image displays 180C-D of optical assembly 180A-B, which is driven by image display driver 642 to present the sequence of displayed images, including the initial displayed image with the initial field of view and the successive displayed image with the successive field of view.

As shown in FIG. 6, high-speed circuitry 630 includes high-speed processor 632, memory 634, and high-speed wireless circuitry 636. In the example, the image display driver 642 is coupled to the high-speed circuitry 630 and operated by the high-speed processor 632 in order to drive the left and right image displays 180C-D of the optical assembly 180A-B. High-speed processor 632 may be any processor capable of managing high-speed communications and operation of any general computing system needed for electronic eyewear device 100 or 200. High-speed processor 632 includes processing resources needed for managing high-speed data transfers on high-speed wireless connection 637 to a wireless local area network (WLAN) using high-speed wireless circuitry 636. In certain examples, the high-speed processor 632 executes an operating system such as a LINUX operating system or other such operating system of the electronic eyewear device 100 or 200 and the operating system is stored in memory 634 for execution. In addition to any other responsibilities, the high-speed processor 632 executing a software architecture for the electronic eyewear device 100 or 200 is used to manage data transfers with high-speed wireless circuitry 636. In certain examples, high-speed wireless circuitry 636 is configured to implement Institute of Electrical and Electronic Engineers (IEEE) 802.11 communication standards, also referred to herein as WI-FI®. In other examples, other high-speed communications standards may be implemented by high-speed wireless circuitry 636.

Low-power wireless circuitry 624 and the high-speed wireless circuitry 636 of the electronic eyewear devices 100 and 200 can include short range transceivers (BLUETOOTH®) and wireless wide, local, or wide area network transceivers (e.g., cellular or WI-FI®). Mobile device 690, including the transceivers communicating via the low-power wireless connection 625 and high-speed wireless connection 637, may be implemented using details of the architecture of the electronic eyewear device 100 and 200, as can other elements of network 695.

Memory 634 includes any storage device capable of storing various data and applications, including, among other things, color maps, camera data generated by the left and right visible light cameras 114A-B and the image processor 612, as well as images generated for display by the image display driver 642 on the see-through image displays 180C-D of the optical assembly 180A-B. While memory 634 is shown as integrated with high-speed circuitry 630, in other examples, memory 634 may be an independent stand-alone element of the electronic eyewear device 100 or 200. In certain such examples, electrical routing lines may provide a connection through a system on chip that includes the high-speed processor 632 from the image processor 612 or low-power processor 622 to the memory 634. In other examples, the high-speed processor 632 may manage addressing of memory 634 such that the low-power processor 622 will boot the high-speed processor 632 any time that a read or write operation involving memory 634 is needed.

Server system 698 may be one or more computing devices as part of a service or network computing system, for example, that includes a processor, a memory, and network communication interface to communicate over the network 695 with the mobile device 690 and electronic eyewear devices 100 and 200. Electronic eyewear devices 100 and 200 may be connected with a host computer. For example, the electronic eyewear devices 100 or 200 may be paired with the mobile device 690 via the high-speed wireless connection 637 or connected to the server system 698 via the network 695.

Output components of the electronic eyewear devices 100 and 200 include visual components, such as the left and right image displays 180C-D of optical assembly 180A-B as described in FIGS. 2C-D (e.g., a display such as a liquid crystal display (LCD), a plasma display panel (PDP), a light emitting diode (LED) display, a projector, or a waveguide). The image displays 180C-D of the optical assembly 180A-B are driven by the image display driver 642. The output components of the electronic eyewear devices 100 and 200 further include acoustic components (e.g., speakers), haptic components (e.g., a vibratory motor), other signal generators, and so forth. The input components of the electronic eyewear devices 100 and 200, the mobile device 690, and server system 698, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Electronic eyewear devices 100 and 200 may optionally include additional peripheral device elements such as ambient light and spectral sensors, biometric sensors, heat sensors, or other display elements integrated with electronic eyewear device 100 or 200. For example, the peripheral device elements may include any I/O components including output components, motion components, position components, or any other such elements described herein. The electronic eyewear devices 100 and 200 can take other forms and may incorporate other types of frameworks, for example, a headgear, a headset, or a helmet.

For example, the biometric components of the electronic eyewear devices 100 and 200 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WI-FI® or BLUETOOTH® transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 625 and 637 from the mobile device 690 via the low-power wireless circuitry 624 or high-speed wireless circuitry 636.

Head Tracking for VR/AR 3D User Interface

When a user is viewing virtual reality (VR) or augmented reality (AR) content through the electronic eyewear device 100 or 200, the user interface may be locked in front of the user of the electronic eyewear device 100 or 200 in a manner that creates a three-dimensional depth and presence in the real world. To maintain the three-dimensional depth and presence in the real world as the user of the electronic eyewear device 100 or 200 moves her head, the presentation of the user interface must be responsive to head movements. VR and AR headsets and input devices are generally defined as having 3 degrees of freedom (3DoF) or 6 degrees of freedom (6DoF).

As used herein, degrees of freedom (DoF) refer to the number of basic ways a rigid object can move through three-dimensional (3D) space. There are six total degrees of freedom. Three degrees of freedom correspond to rotational movement around the x, y, and z axes, commonly termed pitch, yaw, and roll. The other three degrees of freedom correspond to translational movement along those axes, which can be thought of as moving forward or backward, moving left or right, and moving up or down. Thus, a 3DoF VR and AR headset can track rotational motion but not translational motion, or vice-versa. For the 3DoF headset, whether the user has turned her head left or right, tilted it up or down, or pivoted left and right can be tracked. On the other hand, a 6DoF VR and AR headset can additionally track translational motion and thus can additionally track whether the user has moved forward, backward, laterally, or vertically.

The term 1-DoF user interface (UI) refers to the way visual elements are adapted to follow the user's head movements. A 1-DoF UI effectively tracks the user's head movements to keep the UI parallel to the real world ground. For example, a 1-DoF UI may track the user's head movements in 3DoF and cancel the UI rotation on the z-axis. In this example, the UI will follow the user when she turns her head left or right or tilts her head up or down, but the UI will not rotate when the user pivots left and right. In the case of rotation, the UI remains fixed relative to the real world.

On the other hand, a 0-DoF UI uses no head movement tracking at all. This means that the content rendered on the display does not move based on headset movements, which is synonymous to rendering to screen space or 2D space. A 0-DoF UI thus may stay level with the ground through all head movements as the head movements are not being tracked.

The system and method described herein may improve upon the 1-DoF head tracking UI by providing head tracking in a minimum of 3 degrees of freedom (tracking rotational motion) within a 3-dimensional for all head movements. To perform such head tracking, additional positional terms are defined with respect to FIG. 7A.

Figure 7A:
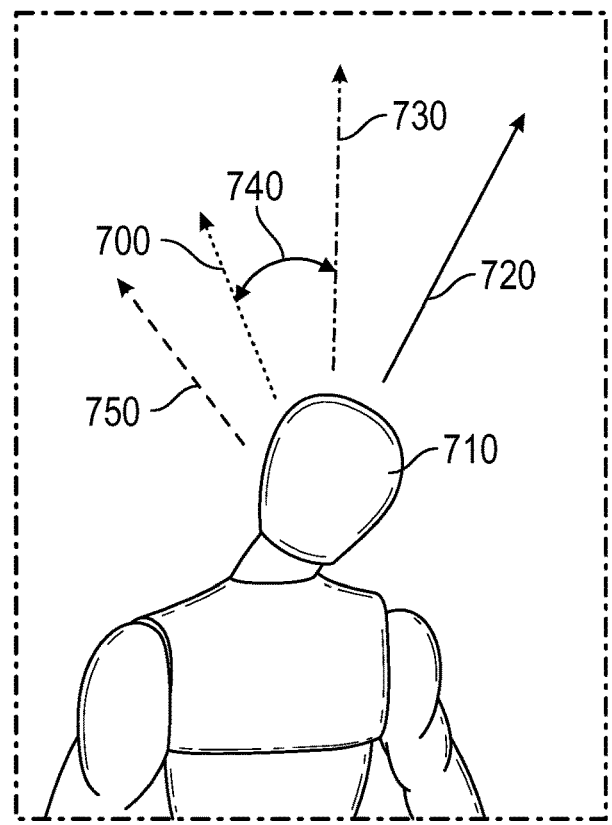
FIG. 7A illustrates vectors for use in 3D head tracking with a minimum of 3 degrees of freedom.

FIG. 7A illustrates vectors for use in 3D head tracking with a minimum of 3 degrees of freedom. As illustrated, the head forward vector 700 represents the forward vector of the user's head 710, which is generally in the direction the user is facing and generally perpendicular to the user's face. On the other hand, the head up vector 720 represents the upward vector of the user's head 710 and is generally perpendicular to the top of the user's head. The world up vector 730 represents the upward vector of the world and is generally perpendicular to the ground. The pitch angle 740 represents the angle between the head forward vector 700 and the world up vector 730 and thus defines the angle of the direction the user is facing with respect to the up direction relative to the ground.

In order to track the current position of the user's head relative to a prior position of the user's head, a position forward vector 750 is further defined to represent the position of the user interface in world relative to the head's position at a constant distance. For example, the position forward vector 750 may represent the user interface position at a point in 3D space from the user's eyes. Conventionally, the position forward vector 750 may move with the head forward vector 700 to remain in front of the user's eyes as the user's head moves in space. However, the position forward vector 750 is defined as distinct from the head forward vector 700 to allow for the soft follow effect described herein that accounts for the angular velocity of the user's head movements for a head-locked augmented reality or virtual reality user interface of the electronic eyewear device 100 or 200. In particular, the position forward vector 750 defines the position of the user interface while the user interface is separated from the head forward vector 700 to lag the position of the head forward vector 700 for a more realistic display in 3D VR and AR space.

Figure 7B:
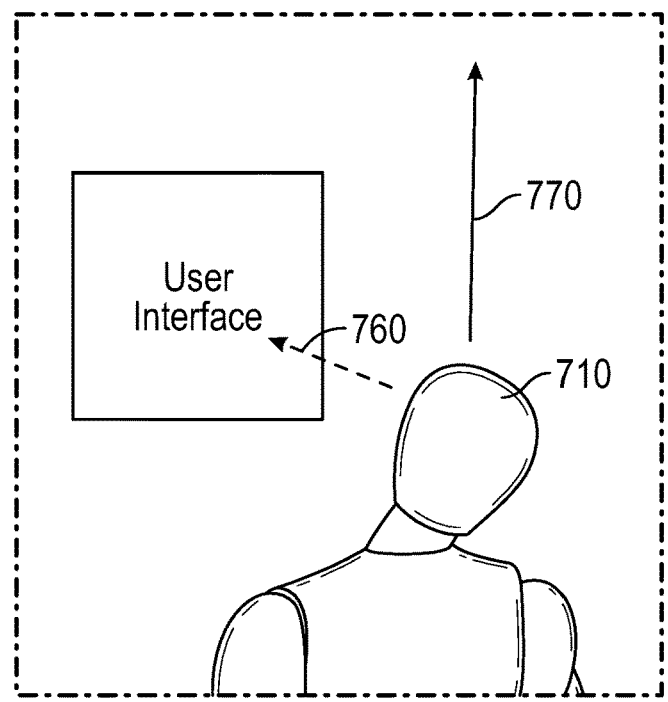
FIG. 7B illustrates a rotation forward vector and an up vector defined to separate the rotational movement of the user interface from the translation of the user interface as the user's head is moved through space.

FIG. 7B illustrates a rotation forward vector and an up vector defined to separate the rotational movement of the user interface from the translation of the user interface as the user's head is moved through space. As illustrated, the rotation forward vector 760 and the up vector 770 separate the rotational movement of the user interface from the translation of the user interface as the user's head 710 is moved through space. The user interface is rotated in the world so that the user interface remains perpendicular to the rotation forward vector 760 and so that its upward vector matches the given up vector 770.

The position forward vector 750, rotation forward vector 760, and up vector 770 enable the system to individually adjust the rates of translation and rotation of the user interface to permit individual adjustments of the translation rates and rotation rates of the user interface as the user's head 710 is moved through space. By disconnecting the translation and rotation of the user interface from the head forward vector 700, the rate of translation and rotational movement of the user interface may be separated from the rate of movement of the user's head to provide a delay in the movement of the user interface relative to the head movement for a more realistic VR and AR 3D presentation.

Soft Rotation

In sample configurations, a soft rotation is applied to the user interface in order to highlight the 3D features of the user interface by observing the user interface from different perspectives and by creating a sense of lightness (less rigidity) in the movement of the user interface as the user's head is moved through space. Also, a soft rotation makes the UI more reactive to the user's head movements in relationship to the world around the user.

Figure 8A:
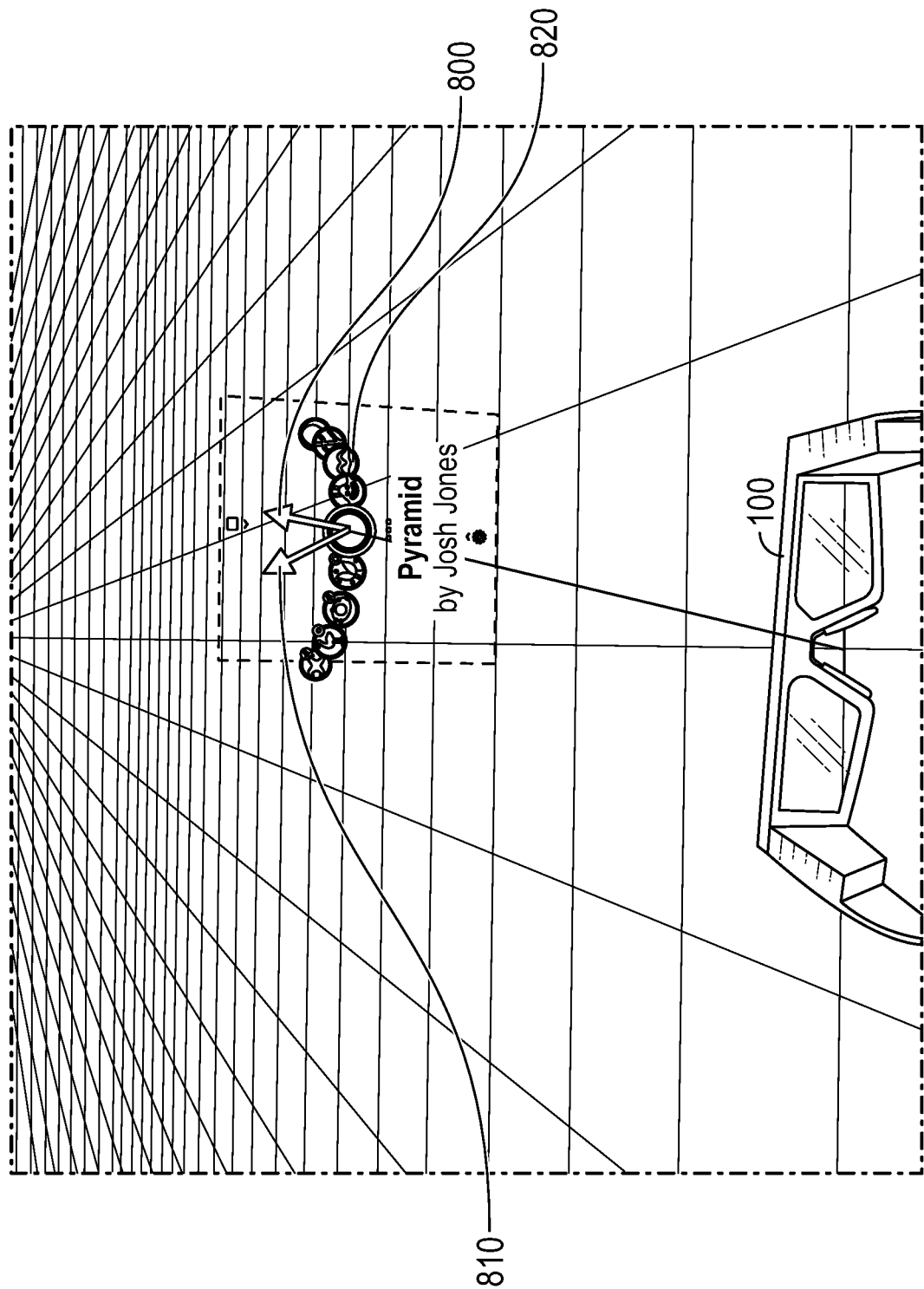
FIG. 8A illustrates the head forward vector of the rotation when facing the user (target rotation) and the rotation forward vector of the current rotation.

The soft rotation is based on the angular velocity of the user's head movements. As illustrated in FIG. 8A, the arrow 800 represents the head forward vector of the rotation when facing the user (target rotation), while the arrow 810 represents the rotation forward vector of the current rotation. As the user's head and the electronic eyewear device 100 is moved from the position of arrow 810 to the position of arrow 800, the user interface 820 may be rotated at a rate that is slower than the rate of the head movement by introducing a delay into the movement of the user interface 820.

For example, the rotation forward vector 810 may be calculated by introducing a rotation damping constant that dampens the rate of rotational movement of the user interface 820 relative to the head movement for a fixed render rate (e.g., 60 Hz) of the user interface. Assuming a fixed render rate and a rotation damping constant, the updated rotation forward vector 810 for a current rendering frame may be calculated as the angular linear interpolation between the rotation forward vector 810 for the previous frame and the head forward vector 800 of the current frame at the specified rotation damping. Assuming a fixed render rate of 60 Hz, a rotation damping constant of 0.09, a rotation forward vector 810 having coordinates (0,0,1) for the previous frame, and a head forward vector 800 having coordinates (1,0,0) for the current frame, the rotation forward vector 810 for the current frame may be represented as the angular linear interpolation between (0,0,1) and (1,0,0), which is (0.141, 0, 0.99). It will be appreciated that adjusting the rotation damping constant affects how quickly the user interface catches up to the user's head position and is dependent upon the render rate. For example, if the render rate is doubled, the rotation damping constant would need to be halved to maintain the same relative delay for the soft rotation effect.

Figure 8B:
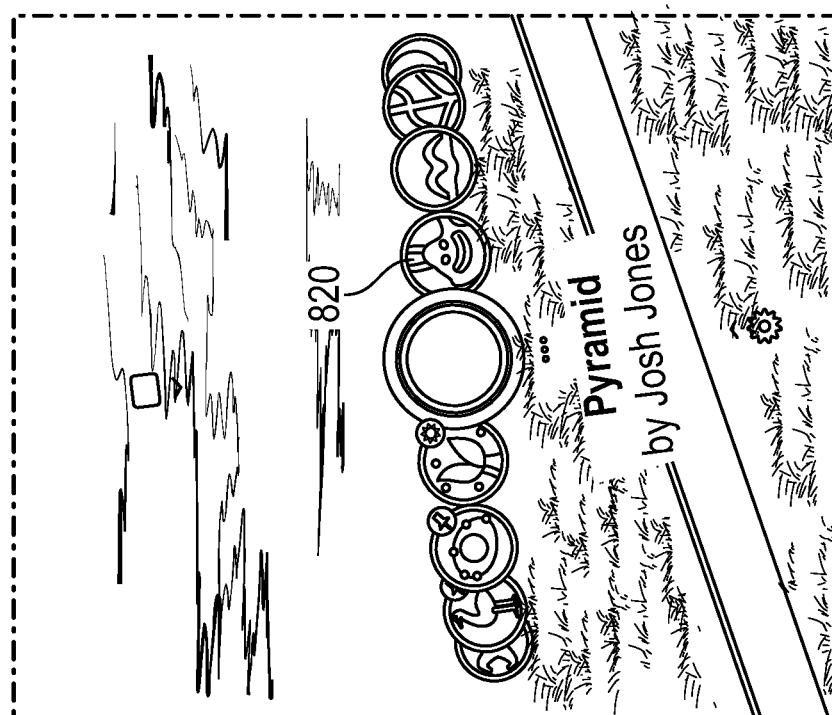
FIG. 8B illustrates a soft rotation effect for a user interface in a sample configuration where the user's head is rotated and the user interface is translated at a slower rate determined by a rotation damping constant.
Figure 8B:
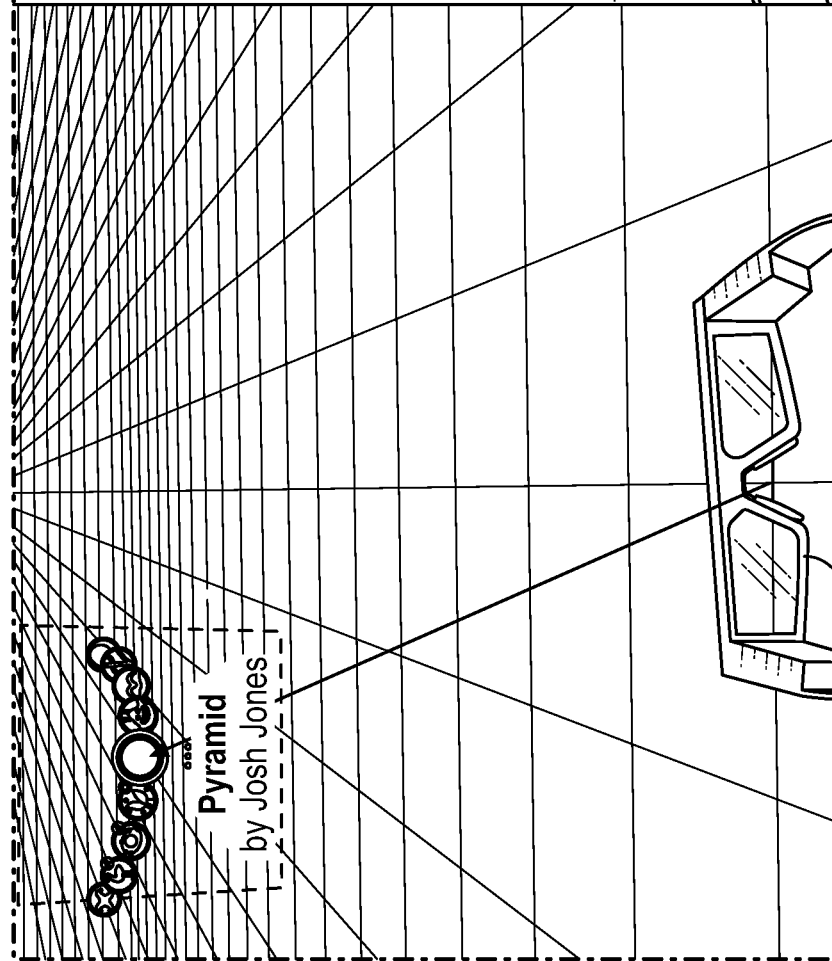

FIG. 8B illustrates the soft rotation effect for a user interface 820. In this example, as the user's head is rotated to rotate the electronic eyewear device 100, and the user interface 820 is rotated in the same way but at a slower rate determined by the rotation damping constant. As a result, the user interface 820 has a "light" feel by following the head movement with a slight delay. It will be appreciated that as the elements of the user interface 820 are farther removed from the axis of rotation, the delay in the movement of the user interface elements relative to the user's head will be more pronounced. The edges of the user interface 820 move at the same rate but have a longer distance to travel, so the slower movement is more apparent. The resulting delay provides a user interface 820 that does not always face the user and is not always flat and thus shows some 3D dimensionality on the display of the electronic eyewear device 100 or 200.

Soft Translation (Follow)

Figure 9A:
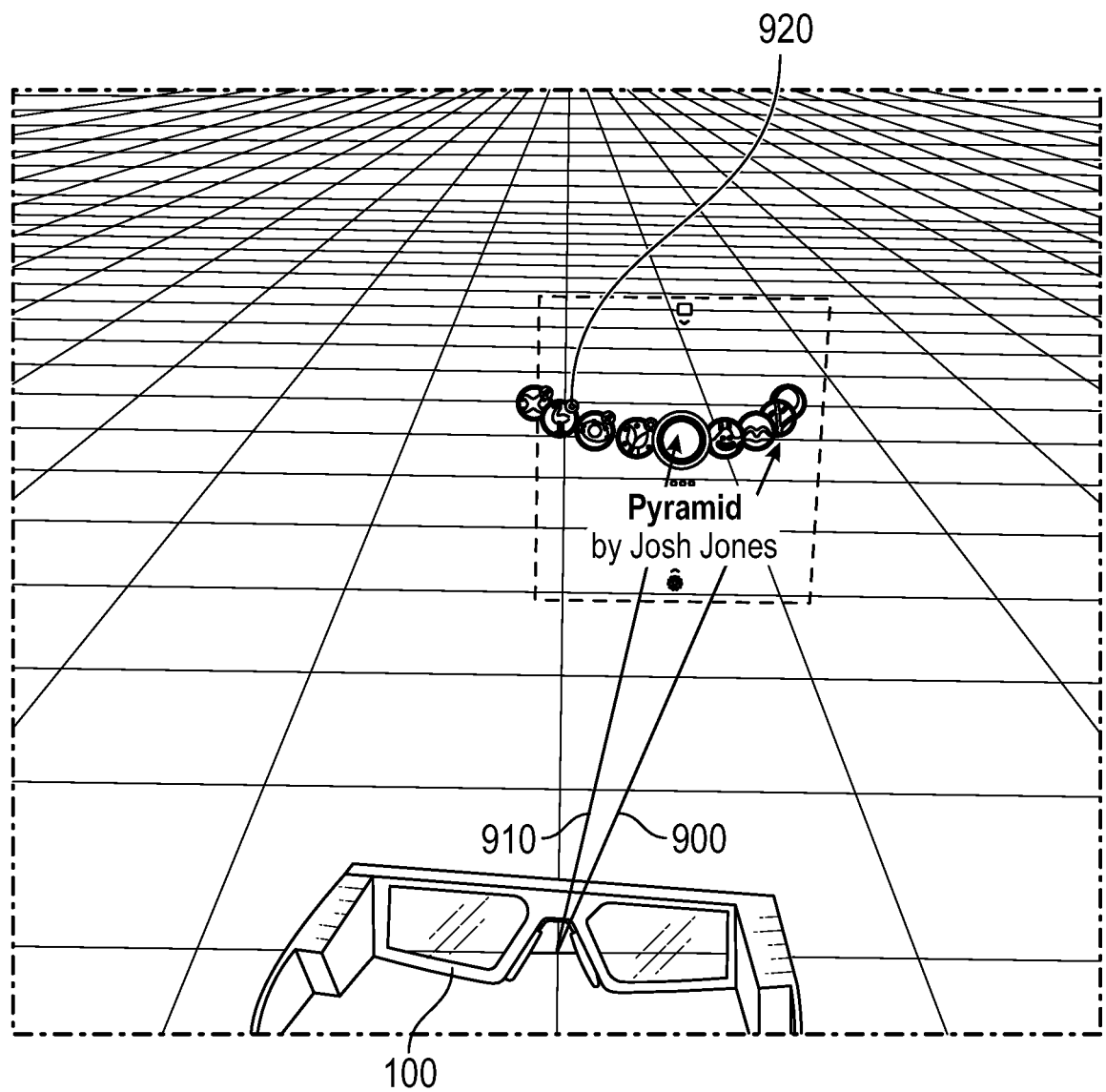
FIG. 9A illustrates the target position of the UI (head forward vector) and the current position of the user interface (position forward vector)

In a sample configuration, a soft translation is applied to the UI in order to increase the sense of presence of the user in the world of the UI. As in the case of soft rotation, the position is based on the angular velocity of the user's head movements. In FIG. 9A, the arrow 900 represents the target position of the UI (head forward vector), while the arrow 910 represents the current position of the user interface (position forward vector). As the user's head is moved from the position of arrow 910 to the position of arrow 900, the user interface 920 may be translated at a rate that is slower than the rate of the head movement by introducing a delay into the translational movement of the user interface 920.

For example, the position forward vector 910 may be calculated by introducing a position damping constant that dampens the rate of translational movement of the user interface 920 relative to the head movement for a fixed render rate (e.g., 60 Hz) of the user interface. Assuming a fixed render rate and a position damping constant, the position forward vector 910 may be calculated for every rendering frame as the angular linear interpolation between the position forward vector 910 of the previous frame and the head forward vector 900 of the current frame at the specified position damping.

For example, assuming a fixed render rate of 60 Hz, a position damping constant of 0.4, a position forward vector having coordinates (0,0,1) in the previous frame, and a head forward vector having coordinates (1,0,0) in the current frame, the updated position forward vector for the current frame may be represented as the angular linear interpolation between (0,0,1) and (1,0,0), which is (0.588, 0, 0.809). It will be appreciated that adjusting the position damping constant affects how quickly the user interface catches up to the user's head position and is dependent upon the render rate. For example, if the render rate is doubled, the position damping constant would need to be halved to maintain the same relative delay for the soft follow effect.

Figure 9B:
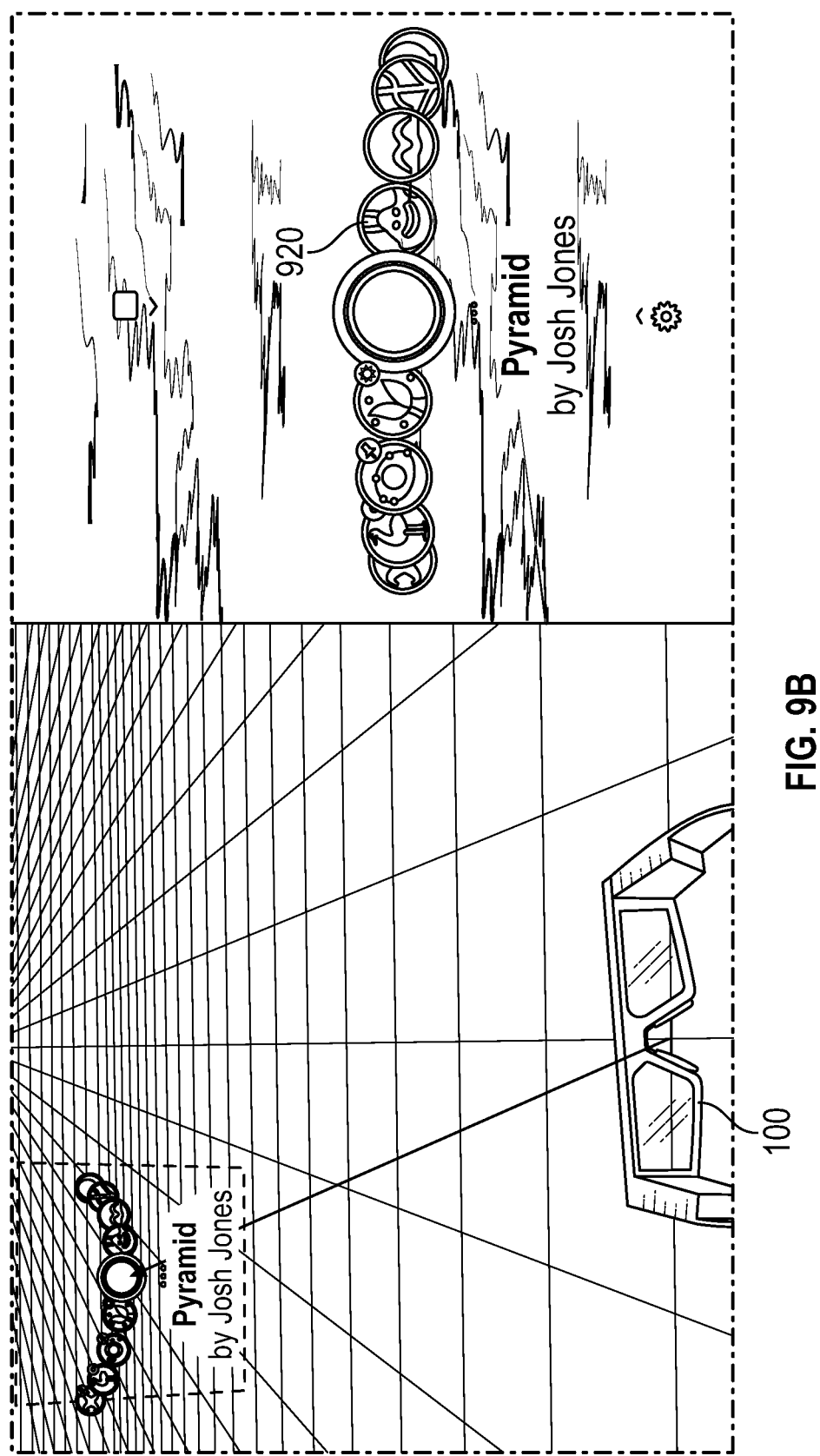
FIG. 9B illustrates a soft follow effect for a user interface where the user's head is moved up and down and the user interface is translated at a slower rate determined by a position damping constant.

FIG. 9B illustrates the soft follow effect for a user interface 920. In this example, as the user's head is moved up and down or left and right, the user interface 920 is translated in the same way but at a slower rate determined by the position damping constant. It will be appreciated that as the elements of the user interface 920 are farther removed from the center of the user interface, the delay in the movement of the user interface elements relative to the user's head will be more pronounced, leading to the deformation in the user interface 920 illustrated in FIG. 9B. As in the case of soft rotation, the edges of the user interface 920 move at the same rate but have a longer distance to travel, so the slower movement is more apparent. The resulting delay provides a user interface that does not always face the user and is not always flat and thus shows some 3D dimensionality on the display of the electronic eyewear device 100 or 200.

Figure 10:
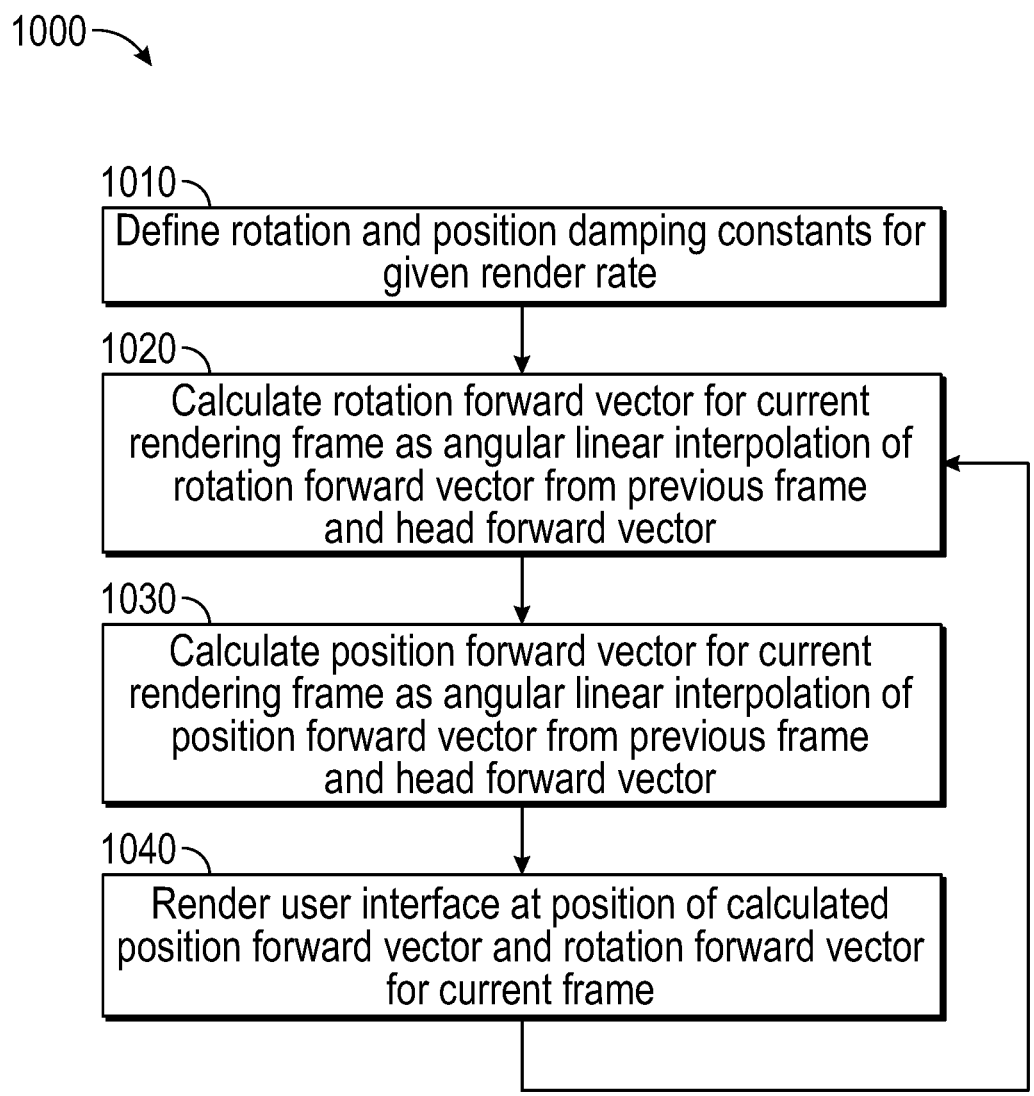
FIG. 10 illustrates a flow chart for implementing the soft follow effect in a sample configuration.

FIG. 10 illustrates a flow chart for implementing the soft follow effect in a sample configuration. As illustrated, the method 1000 includes defining rotation and position damping constants for a given render rate at 1010. The rotation and position damping constants may be preset in the system to provide a faster or slower follow effect for the user interface relative to the head position. However, in sample configurations, the rotation and position damping constants may be adjustable by the user for the desired effect. At 1020, the rotation forward vector is calculated for each rendering frame as the angular interpolation of the rotation forward vector for the previous frame and the head forward vector for the current frame. Similarly, at 1030, the position forward vector is calculated for each rendering frame as the angular interpolation of the position forward vector for the previous frame and the head forward vector for the current frame. It will be appreciated that the calculations at 1020 and 1030 may be performed in any order or simultaneously. At 1040, the UI is rendered at the position of the calculated rotation forward vector and calculated position forward vector for the current frame. Steps 1020-1040 are repeated for each frame.

It will be appreciated in these examples that the render rate affects the time between frames for interpolation using the damping constants on a frame by frame basis and thus affects the damping constants but that the render rate is not otherwise used in the calculation of the rotation forward vector or the position forward vector. It will be further appreciated that using separate damping constants for the translational and rotational movements enables the soft translation and soft rotation effects to be managed separately. Also, the soft follow and soft rotation effects may be dynamically disabled in order to avoid jigger if the rendering frame rate is below a certain threshold.

Safe Pitch Angle

Figure 11A:
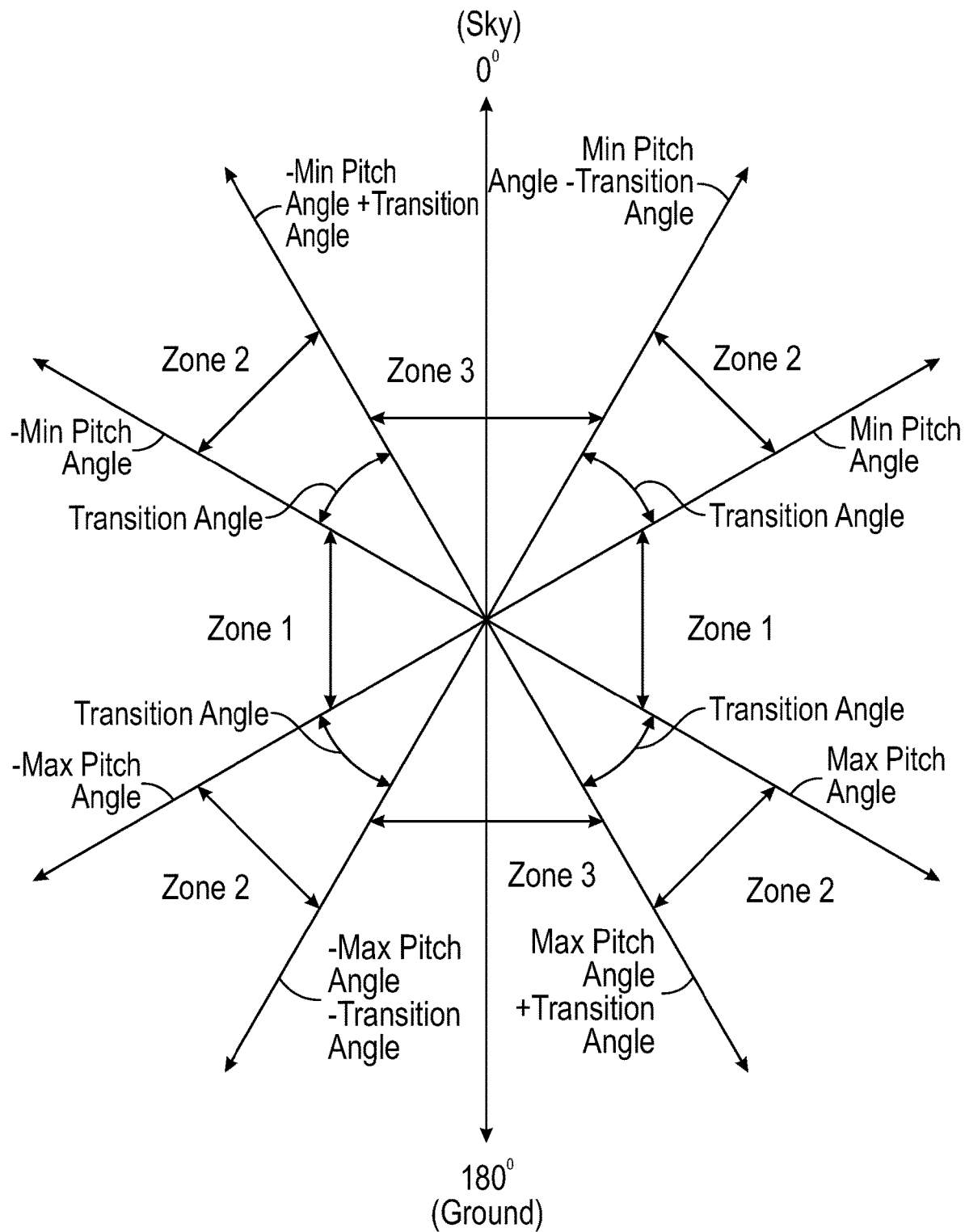
FIG. 11A illustrates the pitch angles of rotation of the head and the defined pitch angle zones in a sample configuration.
Figure 11B:
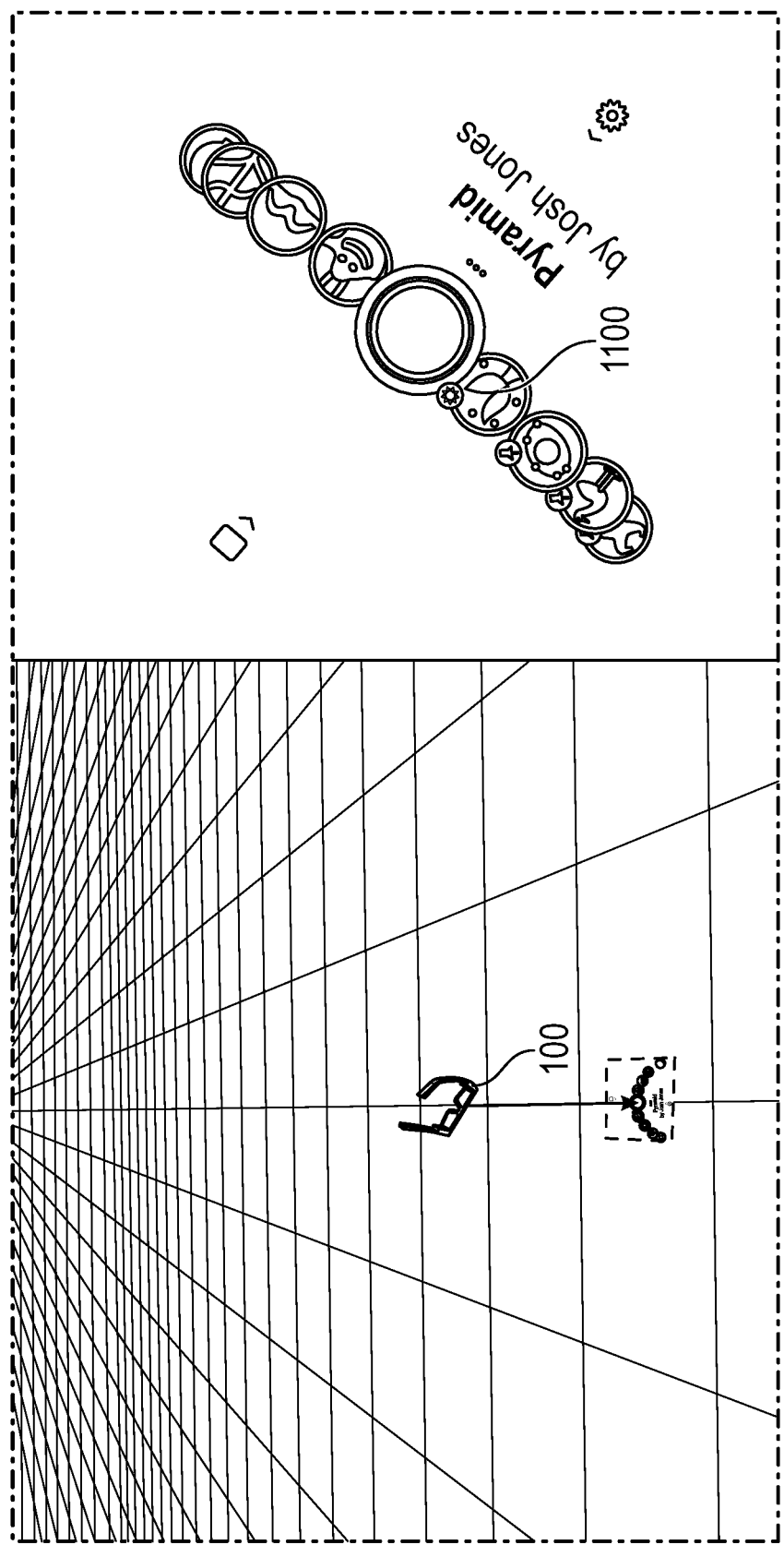
FIG. 11B illustrates the display of the user interface as the user rotates her head down towards the ground.
Figure 11C:
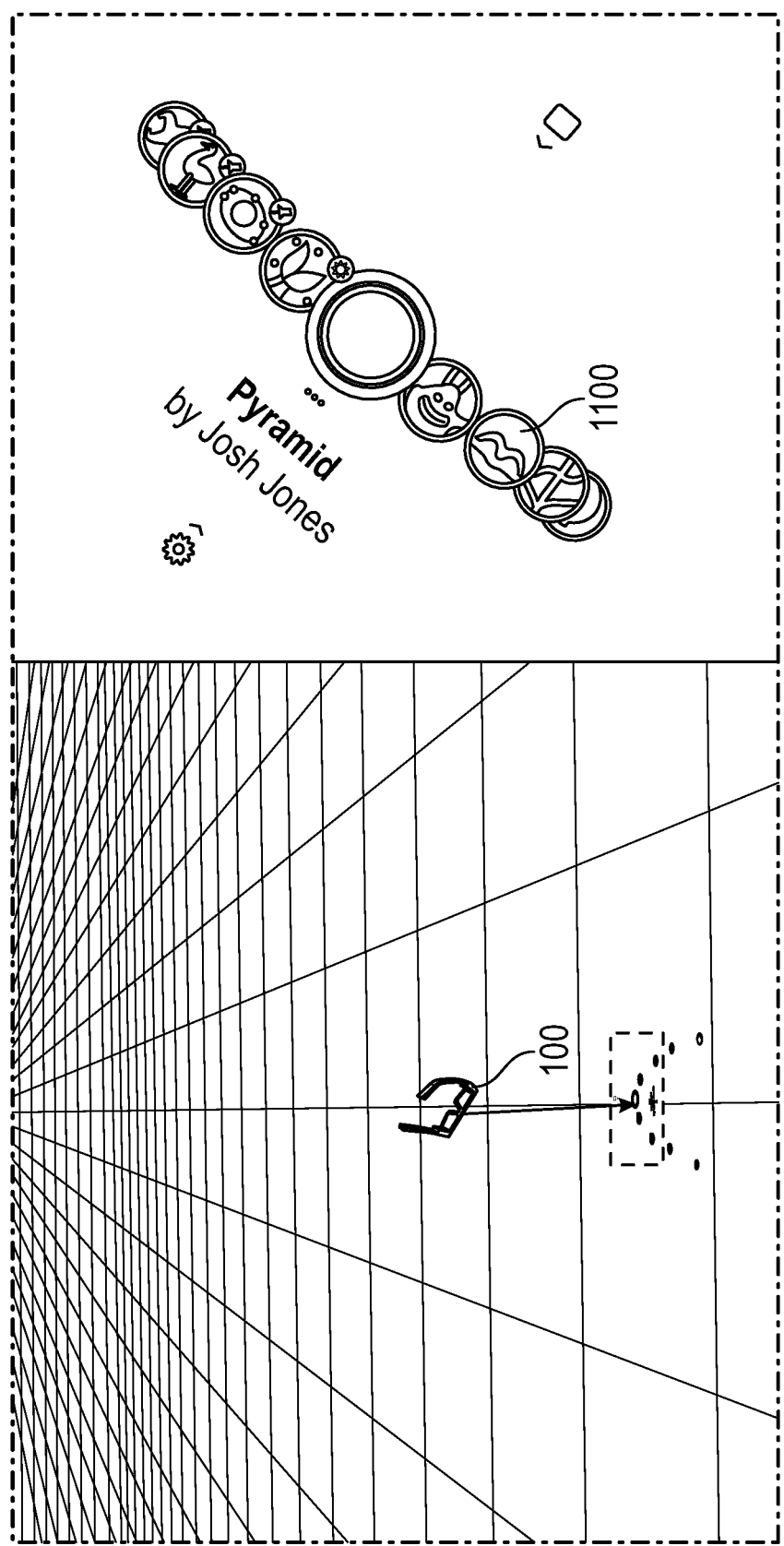
FIG. 11C illustrates the display of the user interface just after the user interface flips upside down at 1800 (facing directly down to the ground)

As noted above, 1-DoF UIs follow the user's head movements by making the UI parallel to the real world ground. As depicted in FIG. 11A, the real world ground may be defined as 180° while the sky is defined as 0°. However, a problem occurs when making the UI parallel to the real world ground. For example, when the user rotates her head and the electronic eyewear device 100 down toward the ground, the user interface 1100 flips upside down at 180°, as depicted in FIG. 11B (just before 180°) versus FIG. 11C (just after 180°). The same effect occurs as the user looks up and moves the user interface through 0°. This "flip" upside down at 90° from the horizontal of the user interface when pitching up or down is generally undesirable.

To avoid such issues with the 1-DoF UI while the user is looking down or up, a safe pitch angle may be defined to make the UI a 0-DoF UI at a designated safe pitch angle. In a sample configuration, the safe pitch angle may be defined as the viewing area between the min pitch angle and max pitch angle depicted in FIG. 11A. In other words, the UI 1100 would operate normally with 1-DoF between the min pitch angle and the max pitch angle (and between the −min pitch angle and the −max pitch angle). However, once the electronic eyewear device 100 moves beyond the min pitch angle or the max pitch angle, the 1-DoF is gradually disabled through a transition angle region. Once the electronic eyewear device moves beyond the min pitch angle minus the transition angle or above the max pitch angle plus the transition angle, then the UI is fully transitioned to 0-DoF and thus the head tracking is disabled.

Figure 11D:
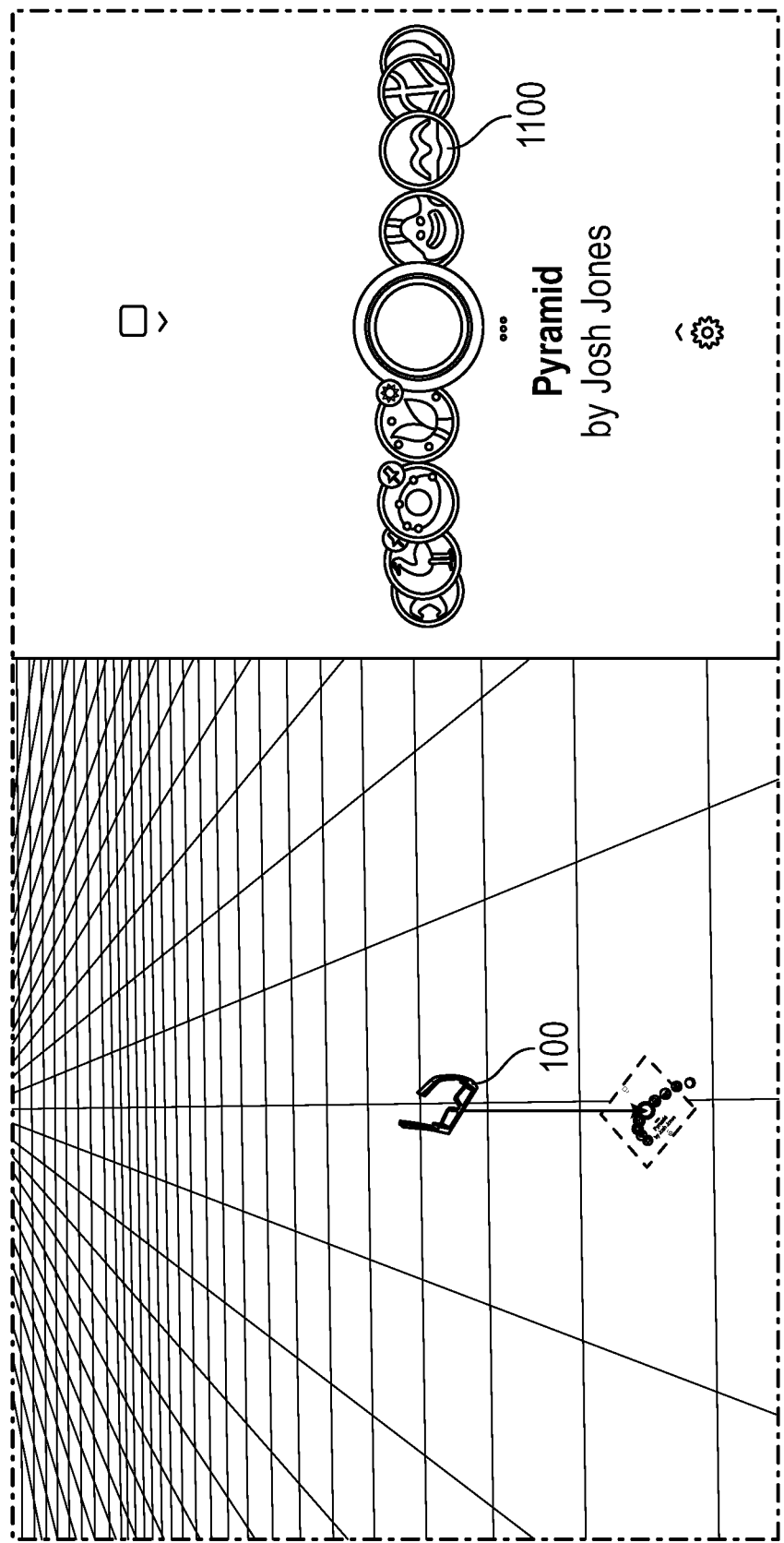
FIG. 11D illustrates the display of the user interface as the user's head faces directly down to the ground after the max pitch angle is exceeded and the user interface has transitioned to become parallel to the head instead of the ground.

In this configuration, the UI appears as shown in FIG. 11D for the angles between 0° and the min pitch angle minus the transition angle or between the max pitch angle plus the transition angle and 180° (and the same for angles between 0° and −180°). Thus, as one moves the electronic eyewear device 100 down towards the ground, at the max pitch angle the UI starts to transition to become parallel to the head instead of the ground, and the transition is complete by the max pitch angle plus the transition angle. At this point, the up vector is defined relative to the position of the head rather than with respect to ground.

In a sample configuration, the up vector may be calculated using the min pitch angle, max pitch angle, and transition angle, which may be three constants defined in the system set up or defined by the user. Three zones are defined for the up vector (see FIG. 11A):

Zone 1: The up vector equals the world up vector (1-DoF) when the pitch angle of the electronic eyewear device 100 is between the min pitch angle and the max pitch angle or the pitch angle is between −min pitch angle and −max pitch angle.

Zone 2: The up vector equals an interpolated vector between the world up vector and the head up vector when the pitch angle of the electronic eyewear device 100 is between the min pitch angle and the min pitch angle-transition angle; when the pitch angle is between −min pitch angle and −(min pitch angle-transition angle); when the pitch angle is between the max pitch angle and the max pitch angle+transition angle; and when the pitch angle is between the −max pitch angle and −(max pitch angle+transition angle).

Zone 3: The up vector equals the head up vector (0-DoF) when the pitch angle of the electronic eyewear device 100 is between min pitch angle-transition angle and −(min pitch angle-transition angle) and when the pitch angle is between max pitch angle+transition angle and −(max pitch angle+transition angle).

As an example, if the min pitch angle=50°, the max pitch angle=130°, and the transition angle=20°, the up vector equals the world up vector and the UI is defined relative to ground from 50° to 130° and from −50° to −130. However, the up vector starts to transition to the head up vector as the pitch angle moves from 50° to 30°, from 130° to 150°, from −50° to −30°, and from −130° to −150°. Finally, the up vector equals the head up vector between 30° and −30° and between 150° and −150°.

Thus, whether the UI is tracking the head movement or not depends upon the pitch angle. The transition occurs in such a way as to prevent the UI from turning upside down or from changing abruptly, thus better representing the 3D dimensionality on the display of the electronic eyewear device 100 or 200.

Figure 12:
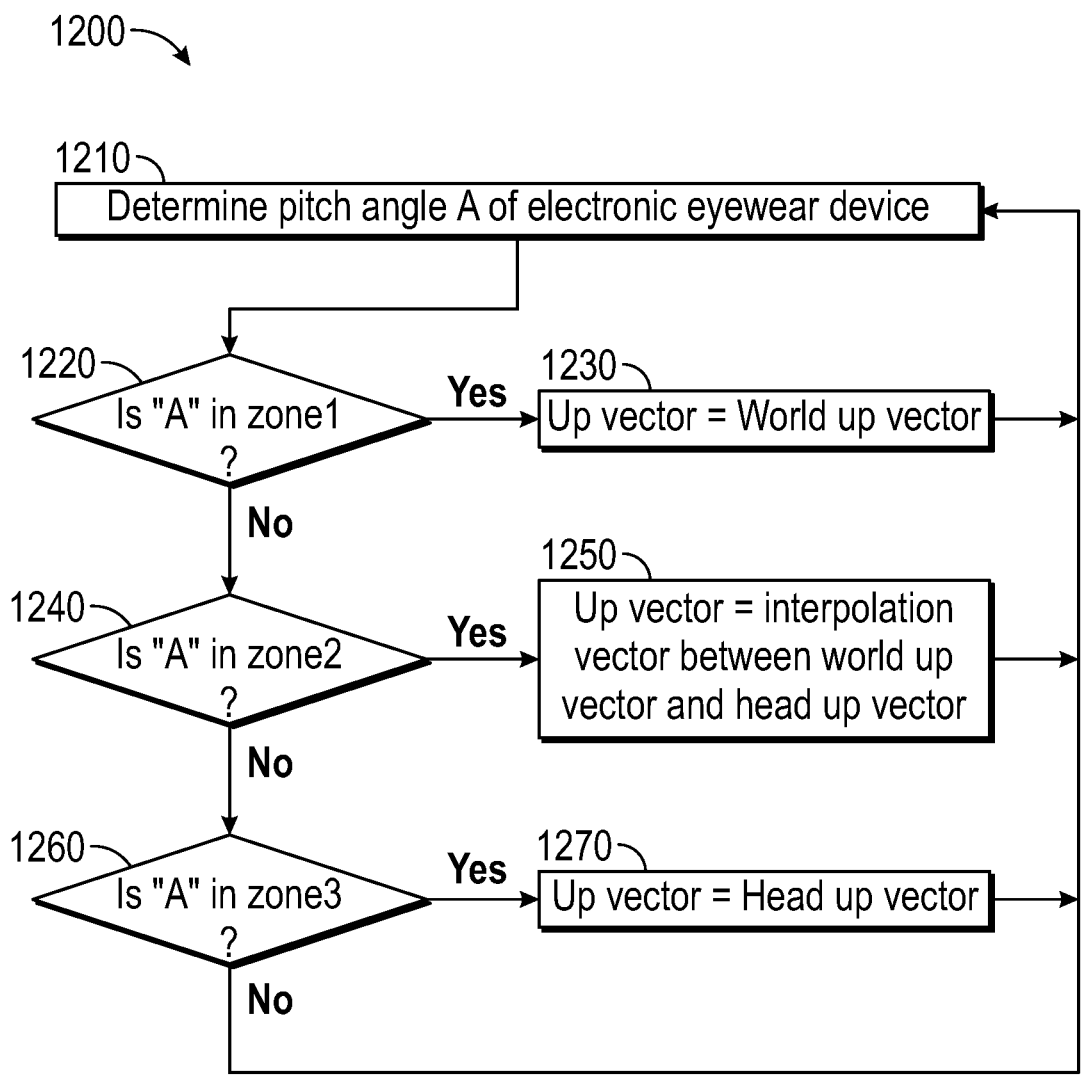
FIG. 12 illustrates a flow chart for implementing the safe pitch angle effect in a sample configuration.

FIG. 12 illustrates a flow chart for implementing the safe pitch angle effect in a sample configuration. As illustrated, the method 1200 includes determining the pitch angle A of the electronic eyewear device 100 at 1210 using, for example, the inertial measurement unit 640. The orientation of the display is then dictated by the determined pitch angle A. At 1220, if the pitch angle A is in Zone 1, then the up vector is set as the world up vector at 1230 and head tracking is maintained. If the pitch angle is not in Zone 1 but is determined to be in Zone 2 at 1240, then the up vector is calculated at 1250 as the interpolation vector between the world up vector and the head up vector. However, if the pitch angle is not in Zone 1 or Zone 2 but is determined to be in Zone 3 at 1260, then the up vector is set as the head up vector at 1270 and head tracking is stopped. Steps 1220-1270 are repeated for each pitch angle determination.

It will be appreciated in these examples that the minimum and maximum pitch angles as well as the transition angle may be preset or settable by the user. Also, it will be appreciated that the techniques described herein are not limited to a particular electronic eyewear device but also may be applied to other types of headwear with head tracking features.

System Configuration

Techniques described herein may be used with one or more of the computer systems described herein or with one or more other systems. For example, the various procedures described herein may be implemented with hardware or software, or a combination of both. For example, at least one of the processor, memory, storage, output device(s), input device(s), or communication connections discussed below can each be at least a portion of one or more hardware components. Dedicated hardware logic components can be constructed to implement at least a portion of one or more of the techniques described herein. For example, and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

Figure 13:
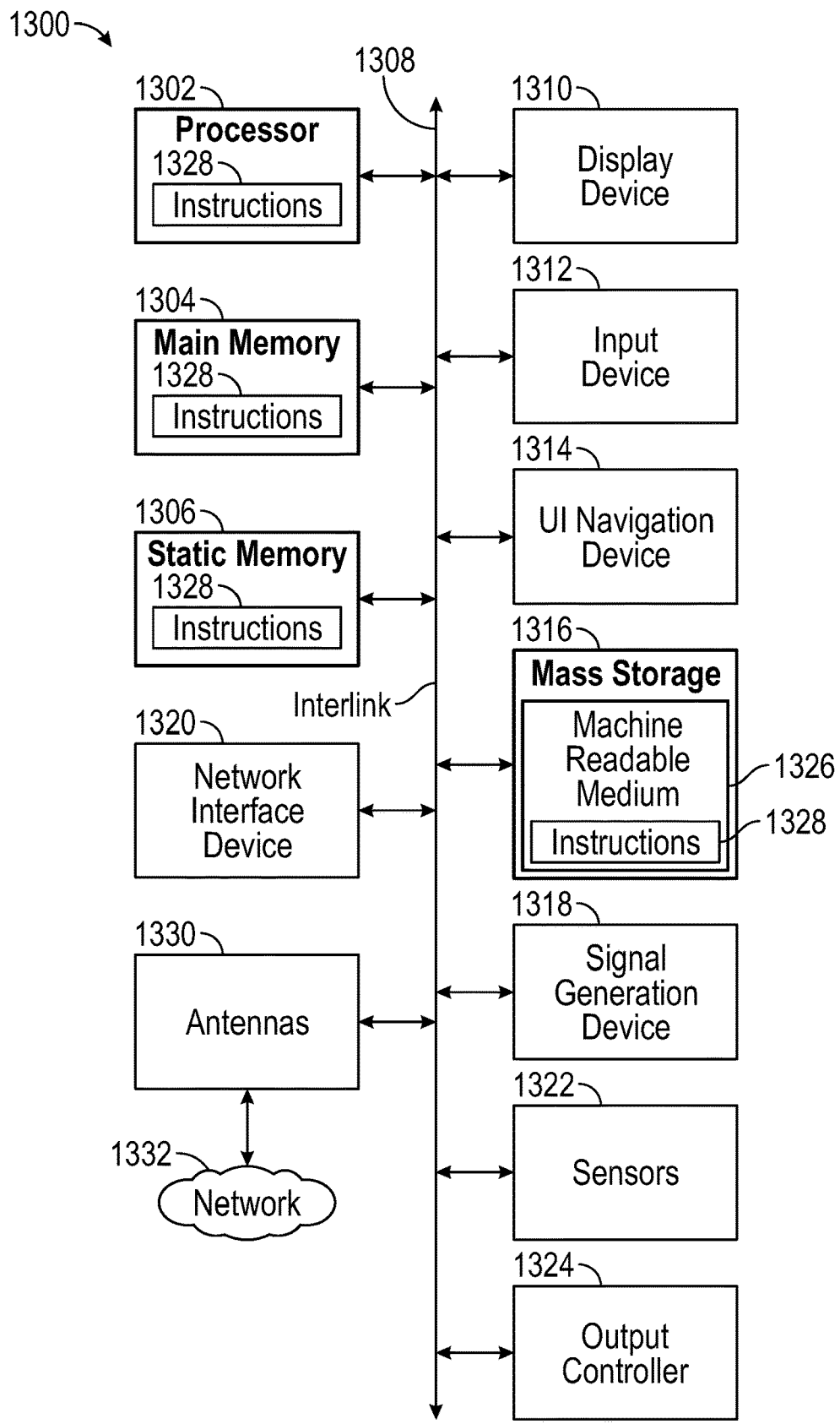
FIG. 13 illustrates a sample configuration of a computer system adapted to implement at least the backend server system in accordance with the systems and methods described herein.

By way of example, FIG. 13 illustrates a sample configuration of a computer system 1300 adapted to implement the backend services (e.g., voice-to-text or image processing services) in accordance with the systems and methods described herein. In particular, FIG. 13 illustrates a block diagram of an example of a machine 1300 upon which one or more configurations may be implemented. In alternative configurations, the machine 1300 may operate as a standalone device or may be connected (e.g., networked) to other machines. In a networked deployment, the machine 1300 may operate in the capacity of a server machine, a client machine, or both in server-client network environments. In an example, the machine 1300 may act as a peer machine in peer-to-peer (P2P) (or other distributed) network environment. In sample configurations, the machine 1300 may be a personal computer (PC), a tablet PC, a set-top box (STB), a personal digital assistant (PDA), a mobile telephone, a smart phone, a web appliance, a server, a network router, switch or bridge, or any machine capable of executing instructions (sequential or otherwise) that specify actions to be taken by that machine. For example, machine 1300 may serve as a workstation, a front-end server, or a back-end server of a communication system. Machine 1300 may implement the methods described herein by running the software used to implement the bots generated as described herein. Further, while only a single machine 1300 is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. The software, when executed by the underlying hardware of the module, causes the hardware to perform the specified operations.

Accordingly, the term "module" is understood to encompass at least one of a tangible hardware or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1300 may include a hardware processor 1302 (e.g., a central processing unit (CPU), a graphics processing unit (GPU), a hardware processor core, or any combination thereof), a main memory 1304 and a static memory 1306, some or all of which may communicate with each other via an interlink (e.g., bus) 1308. The machine 1300 may further include a display unit 1310 (shown as a video display), an alphanumeric input device 1312 (e.g., a keyboard), and a user interface (UI) navigation device 1314 (e.g., a mouse). In an example, the display unit 1310, input device 1312 and UI navigation device 1314 may be a touch screen display. The machine 1300 may additionally include a mass storage device (e.g., drive unit) 1316, a signal generation device 1318 (e.g., a speaker), a network interface device 1320, and one or more sensors 1322. Example sensors 1322 include one or more of a global positioning system (GPS) sensor, compass, accelerometer, temperature, light, camera, video camera, sensors of physical states or positions, pressure sensors, fingerprint sensors, retina scanners, or other sensors. The machine 1300 may include an output controller 1324, such as a serial (e.g., universal serial bus (USB), parallel, or other wired or wireless (e.g., infrared(IR), near field communication (NFC), etc.) connection to communicate or control one or more peripheral devices (e.g., a printer, card reader, etc.).

The mass storage device 1316 may include a machine readable medium 1326 on which is stored one or more sets of data structures or instructions 1328 (e.g., software) embodying or utilized by any one or more of the techniques or functions described herein. The instructions 1328 may also reside, completely or at least partially, within the main memory 1304, within static memory 1306, or within the hardware processor 1302 during execution thereof by the machine 1300. In an example, one or any combination of the hardware processor 1302, the main memory 1304, the static memory 1306, or the mass storage device 1316 may constitute machine readable media.

While the machine readable medium 1326 is illustrated as a single medium, the term "machine readable medium" may include a single medium or multiple media (e.g., at least one of a centralized or distributed database, or associated caches and servers) configured to store the one or more instructions 1328. The term "machine readable medium" may include any medium that is capable of storing, encoding, or carrying instructions for execution by the machine 1300 and that cause the machine 1300 to perform any one or more of the techniques of the present disclosure, or that is capable of storing, encoding, or carrying data structures used by or associated with such instructions. Non-limiting machine readable medium examples may include solid-state memories, and optical and magnetic media. Specific examples of machine readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 1328 may further be transmitted or received over communications network 1332 using a transmission medium via the network interface device 1320. The machine 1300 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1320 may include one or more physical jacks (e.g., Ethernet, coaxial, or phone jacks) or one or more antennas 1330 to connect to the communications network 1332. In an example, the network interface device 1320 may include a plurality of antennas 1330 to wirelessly communicate using at least one of single-input multiple-output (SIMO), multiple-input multiple-output (MIMO), or multiple-input single-output (MISO) techniques. In some examples, the network interface device 1320 may wirelessly communicate using Multiple User MIMO techniques.

The features and flow charts described herein can be embodied in on one or more methods as method steps or in one more applications as described previously. According to some configurations, an "application" or "applications" are program(s) that execute functions defined in the programs. Various programming languages can be employed to generate one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application can invoke API calls provided by the operating system to facilitate functionality described herein. The applications can be stored in any type of computer readable medium or computer storage device and be executed by one or more general purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of at least one of executable code or associated data that is carried on or embodied in a type of machine readable medium. For example, programming code could include code for the touch sensor or other functions described herein. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from the server system 720 or host computer of the service provider into the computer platforms of the client devices 810. Thus, another type of media that may bear the programming, media content or meta-data files includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to "non-transitory", "tangible", or "storage" media, terms such as computer or machine "readable medium" refer to any medium that participates in providing instructions or data to a processor for execution.

Hence, a machine readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read at least one of programming code or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An electronic eyewear device adapted to be worn on the head of a user, comprising:
   a frame;
   at least one optical assembly within the frame;
   at least one display located within the at least one optical assembly adapted to display a user interface;
   a memory that stores instructions; and
   a processor that executes the instructions to perform head tracking operations including:
   determining at least one of a rotation damping constant or a position damping constant for a given render frame rate of the user interface,
   calculating at least one of a rotation forward vector or a position forward vector for a position of the user interface for a current rendering frame, calculation of the rotation forward vector comprising calculating an angular linear interpolation of the rotation forward vector for a previous frame and a head forward vector of a current frame at a rotation damping specified by the rotation damping constant, and calculation of the position forward vector comprising calculating an angular linear interpolation of the position forward vector for the previous frame and a head forward vector of the current frame at a position damping specified by the position damping constant, and
   rendering the user interface to the display for the current rendering frame at a position of at least one of the calculated position forward vector or the calculated rotation forward vector, whereby at least one of translational or rotational movement of the user interface is delayed relative to movement of the user's head.

2. The electronic eyewear device of claim 1, wherein the processor executes the instructions to perform the calculating and rendering once per rendering frame of the user interface.

3. The electronic eyewear device of claim 1, wherein the processor executes the instructions to perform the determining of at least one of the rotation damping constant or the position damping constant for the given render frame rate of the user interface by reading a preset value or determining a value provided by a user for at least one of the rotation damping constant or the position damping constant for the given render frame rate.

4. The electronic eyewear device of claim 1, wherein the processor executes the instructions to perform additional operations including dynamically disabling delayed rendering of at least one of translational or rotational movement of the user interface relative to movement of the user's head when the render frame rate is below a threshold.

5. The electronic eyewear device of claim 1, wherein the processor executes the instructions to perform head tracking operations including:
   determining a pitch angle A of the electronic eyewear device with respect to ground;
   determining a minimum pitch angle and a maximum pitch angle by reading a value that is at least one of preset or provided by a user for at least one of the minimum pitch angle or the maximum pitch angle;
   when the pitch angle A is in a first zone between the minimum pitch angle and the maximum pitch angle, setting an up vector for the user interface as equal to a world up vector relative to ground,
   when the pitch angle A is in a second zone in a first transition angle region between the minimum pitch angle and a first angle region relative to a real world sky or in a second transition angle region between the maximum pitch angle and a second angle region relative to a real world ground, setting an up vector for the user interface as equal to an interpolated vector between a world up vector relative to ground and a head up vector for a user's head, or when the pitch angle A is in a third zone in the first angle region relative to the real world sky or in the second angle region relative to the real world ground, setting an up vector for the user interface as equal to a head up vector for a user's head; and rendering the user interface in alignment with the up vector.

6. The electronic eyewear device of claim 5, wherein the processor executes the instructions to determine the first transition angle region and the second transition angle region by determining a value that is at least one of preset or provided by the user for at least one of the first transition angle region or the second transition angle region.

7. A method of displaying a user interface on a display of an electronic eyewear device adapted to be worn on the head of a user, comprising:

determining at least one of a rotation damping constant or a position damping constant for a given render frame rate of the user interface;

calculating at least one of a rotation forward vector or a position forward vector for a position of the user interface for a current rendering frame, calculation of the rotation forward vector comprising calculating an angular linear interpolation of the rotation forward vector for a previous frame and a head forward vector of a current frame at a rotation damping specified by the rotation damping constant, and calculation of the position forward vector comprising calculating an angular linear interpolation of the position forward vector for the previous frame and a head forward vector of the current frame at a position damping specified by the position damping constant; and rendering the user interface to the display for the current rendering frame at a position of at least one of the calculated position forward vector or the calculated rotation forward vector, whereby at least one of translational or rotational movement of the user interface is delayed relative to movement of the user's head.

8. The method of claim 7, wherein the calculating and rendering are performed once per rendering frame of the user interface.

9. The method of claim 7, wherein a value for at least one of the rotation damping constant or the position damping constant for the given render frame rate is preset or is provided by a user.

10. The method of claim 7, further comprising dynamically disabling delayed rendering of at least one of translational or rotational movement of the user interface relative to movement of the user's head when the render frame rate is below a threshold.

11. The method of claim 7, further comprising:

determining a pitch angle A of the electronic eyewear device with respect to ground;

determining a minimum pitch angle and a maximum pitch angle by reading a value that is at least one of preset or provided a user for at least one of the minimum pitch angle of the maximum pitch angle;

when the pitch angle A is in a first zone between the minimum pitch angle and the maximum pitch angle, setting an up vector for the user interface as equal to a world up vector relative to ground, when the pitch angle A is in a second zone in a first transition angle region between the minimum pitch angle and a first angle region relative to a real world sky or in a second transition angle region between the maximum pitch angle and a second angle region relative to a real world ground, setting an up vector for the user interface as equal to an interpolated vector between a world up vector relative to ground and a head up vector for a user's head, or when the pitch angle A is in a third zone in the first angle region relative to the real world sky or in the second angle region relative to the real world ground, setting an up vector for the user interface as equal to a head up vector for a user's head; and rendering the user interface in alignment with the up vector.

12. The method of claim 11, further comprising determining the first transition angle region and the second transition angle region by determining a value that is at least one of preset or provided by a user for at least one of the first transition angle region or the second transition angle region.

13. A non-transitory computer-readable medium comprising instructions that when executed by one or more processors cause the one or more processors to implement a method of displaying a user interface on a display of an electronic eyewear device adapted to be worn on the head of a user by performing operations comprising:

determining at least one of a rotation damping constant or a position damping constant for a given render frame rate of the user interface;

calculating at least one of a rotation forward vector or a position forward vector for a position of the user interface for a current rendering frame, calculation of the rotation forward vector comprising calculating an angular linear interpolation of the rotation forward vector for a previous frame and a head forward vector of a current frame at a rotation damping specified by the rotation damping constant, and calculation of the position forward vector comprising calculating an angular linear interpolation of the position forward vector for the previous frame and a head forward vector of the current frame at a position damping specified by the position damping constant; and rendering the user interface to the display for the current rendering frame at a position of at least one of the calculated position forward vector or the calculated rotation forward vector, whereby at least one of translational or rotational movement of the user interface is delayed relative to movement of the user's head.

14. The medium of claim 13, wherein the calculating and rendering are performed once per rendering frame of the user interface.

15. The medium of claim 13, wherein a value for at least one of the rotation damping constant or the position damping constant for the given render frame rate is preset or is provided by a user.

16. The medium of claim 13, further comprising instructions that when executed by one or more processors cause the one or more processors to perform operations comprising dynamically disabling delayed rendering of at least one of translational or rotational movement of the user interface relative to movement of the user's head when the render frame rate is below a threshold.

17. The medium of claim 13, further comprising instructions that when executed by one or more processors cause the one or more processors to perform operations comprising:

determining a pitch angle A of the electronic eyewear device with respect to ground;

determining a minimum pitch angle, a maxim angle, a first transition angle region, and a second transition angle region by determining a value that is at least one of preset or provided by a user for at least one of the minimum pitch angle, the maximum pitch angle, the first transition angle region, or the second transition angle region, when the pitch angle A is in a first zone between the minimum pitch angle and the maximum pitch angle, setting an up vector for the user interface as equal to a world up vector relative to ground, when the pitch angle A is in a second zone in the first transition angle region between the minimum pitch angle and a first angle region relative to a real world sky or in the second transition angle region between the maximum pitch angle and a second angle region relative to a real world ground, setting an up vector for the user interface as equal to an interpolated vector between a world up vector relative to ground and a head up vector for a user's head, or when the pitch angle A is in a third zone in the first angle region relative to the real world sky or in the second angle region relative to the real world ground, setting an up vector for the user interface as equal to a head up vector for a user's head; and rendering the user interface in alignment with the up vector.

* * * * *